US012574159B2

(12) United States Patent　　(10) Patent No.:　US 12,574,159 B2
Gao et al.　　　　　　　　　　　　(45) Date of Patent:　Mar. 10, 2026

(54) INFORMATION COMMUNICATION METHOD AND APPARATUS FOR HARQ-ACK FEEDBACK

(71) Applicant: DATANG MOBILE COMMUNICATIONS EQUIPMENT CO., LTD., Beijing (CN)

(72) Inventors: Xuejuan Gao, Beijing (CN); Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 583 days.

(21) Appl. No.: 17/917,942

(22) PCT Filed: Apr. 9, 2021

(86) PCT No.: PCT/CN2021/086185
§ 371 (c)(1),
(2) Date: Oct. 10, 2022

(87) PCT Pub. No.: WO2021/204255
PCT Pub. Date: Oct. 14, 2021

(65) Prior Publication Data
US 2023/0155737 A1　　May 18, 2023

(30) Foreign Application Priority Data
Apr. 10, 2020　(CN) .......................... 202010281338.4

(51) Int. Cl.
*H04L 1/1812*　　(2023.01)
*H04W 72/0446*　(2023.01)
(Continued)

(52) U.S. Cl.
CPC ....... *H04L 1/1812* (2013.01); *H04W 72/0446* (2013.01); *H04W 72/11* (2023.01); *H04W 72/232* (2023.01)

(58) Field of Classification Search
CPC ... H04L 1/1812; H04L 1/1854; H04L 1/1861; H04L 5/0055; H04L 1/1864;
(Continued)

(56) References Cited

U.S. PATENT DOCUMENTS 11,990,999 B2 *　5/2024　Xiao ...................... H04L 1/1864
12,120,707 B2 *　10/2024　Park ...................... H04L 1/1893
(Continued)

FOREIGN PATENT DOCUMENTS

CN　　110278062 A　　9/2019
CN　　110324132 A　　10/2019
(Continued)

OTHER PUBLICATIONS

Huawei et al.: "Discussion on RRC configurations of LI parameters for eURLLC", 3GPP Draft; R2-1916019, 3rd Generation Partnership Project (3GPP), Mobile Competence Centre; 650, Route Des Lucioles; F-06921 Sophia-Antipolis Cedex; France vol. RAN WG2, no. Reno, USA; Nov. 18, 2019-Nov. 22, 2019 Nov. 8, 2019 (Nov. 8, 2019).
(Continued)

*Primary Examiner* — Chandrahas B Patel
(74) *Attorney, Agent, or Firm* — KILPATRICK TOWNSEND & STOCKTON LLP

(57) ABSTRACT

Disclosed in the present application are an information transmission method and apparatus, used for feeding back hybrid automatic repeat request-acknowledge information to a physical downlink control channel (PDCCH) when the PDCCH indicating a semi-persistent scheduling (SPS) physical downlink shared channel (PDSCH) release and an
(Continued)

Downlink transmission position set $M_{a,c}$

SPS PDSCH are transmitted in a same time slot. The method provided in the present application includes when the PDCCH indicating the SPS resource release is received in a time slot in which the SPS PDSCH is needed to be received, determining to feed back the hybrid automatic repeat request-acknowledge information to the PDCCH, and not to feed back the hybrid automatic repeat request-acknowledge information to a predetermined SPS PDSCH feedback in the SPS PDSCHs; and transmitting a hybrid automatic repeat request-acknowledgement sequence including the hybrid automatic repeat request-acknowledgement information of the PDCCH.

20 Claims, 5 Drawing Sheets

(51) Int. Cl.
  *H04W 72/11* (2023.01)
  *H04W 72/232* (2023.01)
(58) Field of Classification Search
  CPC ..... H04L 1/1896; H04L 1/1607; H04L 5/001;
      H04L 1/16; H04L 1/1887; H04W 72/11;
      H04W 72/232; H04W 72/0446; H04W
      72/23; H04W 72/1273; H04W 72/21
  See application file for complete search history.

(56) References Cited

U.S. PATENT DOCUMENTS

| | | | |
|---|---|---|---|
| 2019/0306841 A1 | 10/2019 | Huang et al. | |
| 2021/0153204 A1* | 5/2021 | Takeda | H04L 5/0023 |
| 2024/0137160 A1* | 4/2024 | Choi | H04W 72/23 |

FOREIGN PATENT DOCUMENTS

| | | |
|---|---|---|
| CN | 110557227 A | 12/2019 |
| CN | 110677222 A | 1/2020 |
| CN | 110875814 A | 3/2020 |
| CN | 110943806 A | 3/2020 |
| TW | 202008811 A | 2/2020 |
| WO | 2019193700 A1 | 10/2019 |
| WO | 2020057565 A1 | 3/2020 |

OTHER PUBLICATIONS

LG Electronics: "Outcome of email thread [100e-NR-Llenh_URLLC-SPS_enh-02]", 3GPP Draft; RI-2001383, 3rd Generation Partnership Project (3GPP), Mobile Competence Centre; 650, Route Des Lucioles; F-06921 Sophia-Antipolis Cedex; France vol. RAN WG1, no. e-Meeting; Feb. 24, 2020-Mar. 6, 2020 Mar. 5, 2020 (Mar. 5, 2020).

Oppo: "Remaining issues on HARQ enhancements for NR-U", 3GPP Draft; RI-2000472, 3rd Generation Partnership Project (3GPP), Mobile Competence Centre; 650, Route Des Lucioles; F-06921 Sophia-Antipolis Cedex; France vol. RAN WG1, no. Athens, Greece; Feb. 24, 2020-Feb. 28, 2020 Feb. 15, 2020 (Feb. 15, 2020).

Nokia et al: "Maintenance of Rel-16 URLLC/IIoT SPS enhancements", 3GPP Draft; RI-2000407, 3rd Generation Partnership Project (3GPP), Mobile Competence Centre; 650, Route Des Lucioles; F-06921 Sophia-Antipolis Cedex; France vol. RAN WG1, no. e-Meeting; Feb. 24-2020-Mar. 6, 2020 Feb. 14, 2020 (Feb. 14, 2020).

* cited by examiner

K0=0

K1=4

|← Slot n →|← Slot n+1 →|← Slot n+2 →|← Slot n+3 →|← Slot n+4 →|

DCI ▯      PDSCH ▨      HARQ feedback ▨

Downlink transmission position set $M_{a,c}$

K1=9
K1=8
K1=7
K1=4
K1=3   K1=2 n   n+1   n+2   n+3   n+4   n+5   n+6   n+7   n+8   n+9

|←———————————— Radio frame i ————————————→|

▨ DL      ▨ UL      ▯ Flexible

INFORMATION COMMUNICATION METHOD AND APPARATUS FOR HARQ-ACK FEEDBACK

CROSS-REFERENCE OF RELATED APPLICATIONS

The present application is a National State of International Application No. PCT/CN2021/086185, filed on Apr. 9, 2021, which claims the priority from Chinese Patent Application No. 202010281338.4, filed with the Chinese Patent Office on Apr. 10, 2020 and entitled "Information Communication method and Apparatus", both of which are hereby incorporated by reference in their entireties.

FIELD OF DISCLOSURE

The present application relates to the field of communication technologies, and particularly to an information communication method and apparatus.

BACKGROUND

The semi-static Hybrid Automatic Repeat reQuest (HARQ) acknowledgment (including Acknowledgment (ACK) and Negative Acknowledgement (NACK); for the convenience of description herein, HARQ-ACK is uniformly used to represent Hybrid Automatic Repeat reQuest Acknowledgment information) codebook is supported in the New Radio (NR) technology.

When the semi-static HARQ-ACK codebook is used, and when a terminal only has the ability to receive a unicast Physical Downlink Shared CHannel (PDSCH) in one slot, only a position of the HARQ-ACK feedback information corresponding to one PDSCH is reserved in the semi-static HARQ-ACK code for one slot. If a Physical Downlink Control Channel (PDCCH, also called SPS PDSCH release) indicating Semi-Persistent Scheduling (SPS) resource release and an SPS PDSCH appear at the same time in one slot, there is no redundant HARQ-ACK feedback position to transmit the HARQ-ACK feedback of the PDCCH indicating the SPS resource release, and there is no clear solution on how to perform the HARQ-ACK feedback at this time. In one embodiment, when the terminal has the ability to receive more than one unicast PDSCH in one slot, it is assumed that the maximum number of unicast PDSCHs that can be received is A. When there are already A SPS PDSCHs that need to feedback HARQ-ACKs in one slot, if there is also a PDCCH indicating the SPS resource release in this slot, there is no redundant HARQ-ACK feedback position to transmit the HARQ-ACK feedback of the PDCCH indicating the SPS resource release, and there is no clear solution on how to perform the HARQ-ACK feedback at this time.

BRIEF SUMMARY

The embodiments of the present application provide an information communication method and apparatus, and to realize the feedback of the hybrid automatic repeat request acknowledgement information for a PDCCH indicating the SPS PDSCH release when the PDCCH and an SPS PDSCH are transmitted in the same slot.

On the terminal side, an information communication method according to an embodiment of the present application includes:

determining to feed back a hybrid automatic repeat request-acknowledgement information of a PDCCH that indicates SPS resource release and not to feed back a hybrid automatic repeat request-acknowledgement information of a predetermined SPS PDSCH among SPS PDSCHs, and the SPS PDSCHs and the PDCCH are in the same slot;

transmitting a hybrid automatic repeat request-acknowledgement sequence containing the hybrid automatic repeat request-acknowledgement information of the PDCCH.

Through this method, when a PDCCH indicating SPS resource release is received in a slot in which SPS PDSCHs need to be received, it is determined to feed back the hybrid automatic repeat request-acknowledgement information to the PDCCH and not to feed back the hybrid automatic repeat request-acknowledgement information to a predetermined SPS PDSCH among the SPS PDSCHs; and a hybrid automatic repeat request-acknowledgement sequence containing the hybrid automatic repeat request-acknowledgement information of the PDCCH is transmitted, and realizing the feedback of the hybrid automatic repeat request-acknowledgement information to the PDCCH when the PDCCH indicating SPS PDSCH release and the SPS PDSCH are transmitted in the same slot.

In one embodiment, the determining to feed back a hybrid automatic repeat request-acknowledgement information of the PDCCH and not to feed back a hybrid automatic repeat request-acknowledgement information of a predetermined SPS PDSCH among the SPS PDSCHs, includes at least one of followings:

Case 1: for a terminal that supports receiving at most A unicast PDSCHs in one slot, in response to a PDCCH indicating SPS resource release being received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, and A is greater than 1, and B is less than or equal to A;

Case 2: for a terminal that supports receiving at most one unicast PDSCH in one slot, in response to a PDCCH indicating SPS resource release being received in a slot in which an SPS PDSCH needs to be received, determining to feed back a hybrid automatic repeat request-acknowledgement information of the PDCCH and not to feed back a hybrid automatic repeat request-acknowledgement information to the SPS PDSCH;

Case 3: in response to a hybrid automatic repeat request-acknowledgement information of the PDCCH and a hybrid automatic repeat request-acknowledgement information of the SPS PDSCHs needing to be transmitted in a same slot or sub-slot, determining to feed back a hybrid automatic repeat request-acknowledgement information of the PDCCH and not to feed back a hybrid automatic repeat request-acknowledgement information of a predetermined SPS PDSCH among the SPS PDSCHs;

Case 4: determining to feed back a hybrid automatic repeat request-acknowledgement information of the PDCCH and not to feed back a hybrid automatic repeat request-acknowledgement information of a predetermined SPS PDSCH among the SPS PDSCHs in response to one of following conditions being met:

a hybrid automatic repeat request-acknowledgement information of the PDCCH and a hybrid automatic repeat request-acknowledgement information of at least one SPS PDSCH are to be transmitted in a same slot or sub-slot, and the at least one SPS PDSCH is one SPS PDSCH of SPS PDSCHs indicated to be released by the PDCCH;

or, a hybrid automatic repeat request-acknowledgement information of the PDCCH and a hybrid automatic repeat request-acknowledgement information of at least one SPS PDSCH are to be transmitted in a same slot or sub-slot, and the at least one SPS PDSCH is transmitted in a slot in which the PDCCH is transmitted and is one SPS PDSCH of SPS PDSCHs indicated to be released by the PDCCH;

or, a hybrid automatic repeat request-acknowledgement information of the PDCCH and a hybrid automatic repeat request-acknowledgement information of the predetermined SPS PDSCH are to be transmitted in a same slot or sub-slot;

Case 5: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs having a same priority;

Case 6: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs being transmitted on a same carrier;

Case 7: determining to feed back a hybrid automatic repeat request-acknowledgement information of the PDCCH and not to feed back a hybrid automatic repeat request-acknowledgement information of a predetermined SPS PDSCH among the SPS PDSCHs in response to the terminal being configured with a semi-static hybrid automatic repeat request-acknowledgement information transmission mode;

Case 8: in response to there are C downlink transmission opportunities in the slot, and a PDCCH indicating SPS resource release is received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, and C is greater than or equal to 1, and B is less than or equal to C.

In one embodiment, the predetermined SPS PDSCH includes:

an SPS PDSCH with a smallest SPS configuration index or largest SPS configuration index among the SPS PDSCHs;

or, in response to the PDCCH only indicating a release of one SPS PDSCH, the predetermined SPS PDSCH is the one SPS PDSCH indicated to be released by the PDCCH;

or, in response to the PDCCH indicating a joint release of a plurality of SPS PDSCHs, the predetermined SPS PDSCH is an SPS PDSCH transmitted in the slot with a smallest SPS configuration index or largest SPS configuration index among the plurality of SPS PDSCHs indicated to be jointly released by the PDCCH, or an SPS PDSCH with a smallest SPS configuration index or largest SPS configuration index among the plurality of SPS PDSCHs indicated to be jointly released by the PDCCH.

In one embodiment, in response to the PDCCH only indicating a release of one SPS PDSCH:

the PDCCH is transmitted in a slot in which the one SPS PDSCH indicated to be released is transmitted;

or, the PDCCH is transmitted in a slot in which the one SPS PDSCH indicated to be released is transmitted, and no later than a position of a start or end symbol of the one SPS PDSCH indicated to be released.

In one embodiment, in response to the PDCCH indicating a joint release of a plurality of SPS PDSCHs:

the PDCCH is transmitted in one of slots in which the plurality of SPS PDSCH indicated to be jointly released are transmitted, or in a slot in which an SPS PDSCH with a smallest SPS configuration index or a largest SPS configuration index among the plurality of SPS PDSCHs is transmitted;

or, the PDCCH is transmitted in one of slots in which the plurality of SPS PDSCHs indicated to be jointly released are transmitted, and no later than a position of a start or end symbol of an SPS PDSCH contained in the one slot and indicated by the PDCCH to be released;

or, the PDCCH is transmitted no later than a position of a start or end symbol of an SPS PDSCH with a smallest SPS configuration index or a largest SPS configuration index among the plurality of SPS PDSCHs indicated to be jointly released in a slot in which the SPS PDSCH with the smallest SPS configuration index or a largest SPS configuration index is transmitted.

In one embodiment, in response to SPS PDSCHs indicated to be released by the PDCCH being contained in the slot, or in response to at least one of SPS PDSCHs indicated to be released by the PDCCH being contained in the slot, or in response to an SPS PDSCH with a smallest SPS configuration index or a largest SPS configuration index among SPS PDSCHs indicated to be released by the PDCCH being contained in the slot, determining to feed back a hybrid automatic repeat request-acknowledgement information of the PDCCH and not to feed back a hybrid automatic repeat request-acknowledgement information of the predetermined SPS PDSCH among the SPS PDSCHs.

In one embodiment, in response to the PDCCH only indicating a release of one SPS PDSCH:

a terminal does not expect the PDCCH not to be transmitted in a slot where the SPS PDSCH indicated to be released by the PDCCH is located, or does not expect the PDCCH to be transmitted in a slot that does not contain the SPS PDSCH indicated to be released by the PDCCH;

or, the terminal does not expect the PDCCH not to be transmitted earlier than a position of a start or end symbol of the SPS PDSCH in a slot where the SPS PDSCH indicated to be released by the PDCCH is located, or does not expect the PDCCH to be transmitted later than a position of a start or end symbol of the SPS PDSCH in a slot where the SPS PDSCH indicated to be released by the PDCCH is located.

In one embodiment, in response to the PDCCH indicating a joint release of a plurality of SPS PDSCHs:

a terminal does not expect the PDCCH not to be transmitted in a slot in which an SPS PDSCH with a smallest SPS configuration index or a largest SPS configuration index among the SPS PDSCHs indicated to be jointly released by the PDCCH is transmitted, or the terminal does not expect the PDCCH to be transmitted in a slot that does not contain an SPS PDSCH with a smallest configuration index or a largest SPS configuration index among the SPS PDSCHs indicated to be jointly released by the PDCCH;

or, the terminal does not expect the PDCCH not to be transmitted earlier than a position of a start or end symbol of an SPS PDSCH with a smallest or largest SPS configuration index among the SPS PDSCHs indicated to be jointly released by the PDCCH in a slot in which the SPS PDSCH with the smallest or largest SPS configuration index is transmitted, or the terminal does not expect the PDCCH to be transmitted later than a position of a start or end symbol of an SPS PDSCH with a smallest or largest SPS configuration index among the SPS PDSCHs indicated to be jointly released by the PDCCH in a slot in which the SPS PDSCH with the smallest or largest SPS configuration index is transmitted.

In one embodiment, the hybrid automatic repeat request-acknowledgement information of the PDCCH is mapped to a hybrid automatic repeat request-acknowledgement information position corresponding to the predetermined SPS PDSCH in a hybrid automatic repeat request-acknowledgement codebook for transmission.

In one embodiment, the SPS PDSCHs include: an SPS PDSCH that needs feedback of hybrid automatic repeat request-acknowledgment information, and/or an SPS PDSCH determined not to collide with an uplink symbol according to a slot structure configured by high-layer signaling.

On the network side, an information communication method according to an embodiment of the present application includes:

determining that a terminal feed back a hybrid automatic repeat request-acknowledgement information of a PDCCH that indicates SPS resource release and does not feedback a hybrid automatic repeat request-acknowledgement information of a predetermined SPS PDSCH among SPS PDSCHs, and the SPS PDSCHs and the PDCCH are in the same slot;

receiving a hybrid automatic repeat request-acknowledgement sequence containing the hybrid automatic repeat request-acknowledgement information of the PDCCH.

In one embodiment, determining that the terminal feeds back a hybrid automatic repeat request-acknowledgement information to the PDCCH and does not feedback a hybrid automatic repeat request-acknowledgement information of a predetermined SPS PDSCH among the SPS PDSCHs, includes at least one of followings:

Case 1: for a terminal that supports receiving at most A unicast PDSCHs in one slot, in response to a PDCCH indicating SPS resource release being received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, and A is greater than 1, and B is less than or equal to A;

Case 2: for a terminal that supports receiving at most one unicast PDSCH in one slot, in response to a PDCCH indicating SPS resource release being received in a slot in which an SPS PDSCH needs to be received, determining to feed back a hybrid automatic repeat request-acknowledgement information of the PDCCH and not to feed back a hybrid automatic repeat request-acknowledgement information to the SPS PDSCH;

Case 3: in response to a hybrid automatic repeat request-acknowledgement information of the PDCCH and a hybrid automatic repeat request-acknowledgement information of the SPS PDSCHs needing to be transmitted in a same slot or sub-slot, determining to feed back a hybrid automatic repeat request-acknowledgement information of the PDCCH and not to feed back a hybrid automatic repeat request-acknowledgement information of a predetermined SPS PDSCH among the SPS PDSCHs;

Case 4: determining to feed back a hybrid automatic repeat request-acknowledgement information of the PDCCH and not to feed back a hybrid automatic repeat request-acknowledgement information of a predetermined SPS PDSCH among the SPS PDSCHs in response to one of following conditions being met:

a hybrid automatic repeat request-acknowledgement information of the PDCCH and a hybrid automatic repeat request-acknowledgement information of at least one SPS PDSCH are to be transmitted in a same slot or sub-slot, and the at least one SPS PDSCH is one SPS PDSCH of SPS PDSCHs indicated to be released by the PDCCH;

or, a hybrid automatic repeat request-acknowledgement information of the PDCCH and a hybrid automatic repeat request-acknowledgement information of at least one SPS PDSCH are to be transmitted in a same slot or sub-slot, and the at least one SPS PDSCH is transmitted in a slot in which the PDCCH is transmitted and is one SPS PDSCH of SPS PDSCHs indicated to be released by the PDCCH;

or, a hybrid automatic repeat request-acknowledgement information of the PDCCH and a hybrid automatic repeat request-acknowledgement information of the predetermined SPS PDSCH are to be transmitted in a same slot or sub-slot;

Case 5: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs having a same priority;

Case 6: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs being transmitted on a same carrier;

Case 7: determining to feed back a hybrid automatic repeat request-acknowledgement information of the PDCCH and not to feed back a hybrid automatic repeat request-acknowledgement information of a predetermined SPS PDSCH among the SPS PDSCHs in response to the terminal being configured with a semi-static hybrid automatic repeat request-acknowledgement information transmission mode;

Case 8: in response to there are C downlink transmission opportunities in the slot, and a PDCCH indicating SPS resource release is received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, and C is greater than or equal to 1, and B is less than or equal to C.

In one embodiment, the predetermined SPS PDSCH includes:

an SPS PDSCH with a smallest SPS configuration index or largest SPS configuration index among the SPS PDSCHs;

or, in response to the PDCCH only indicating a release of one SPS PDSCH, the predetermined SPS PDSCH is the one SPS PDSCH indicated to be released by the PDCCH;

or, in response to the PDCCH indicating a joint release of a plurality of SPS PDSCHs, the predetermined SPS PDSCH is an SPS PDSCH transmitted in the slot with a smallest SPS configuration index or largest SPS configuration index among the plurality of SPS PDSCHs indicated to be jointly released by the PDCCH, or an SPS PDSCH with a smallest SPS configuration index or largest SPS configuration index among the plurality of SPS PDSCHs indicated to be jointly released by the PDCCH.

In one embodiment, in response to the PDCCH only indicating release of one SPS PDSCH:

the PDCCH is transmitted in a slot in which the one SPS PDSCH indicated to be released is transmitted;

or, the PDCCH is transmitted in a slot in which the one SPS PDSCH indicated to be released is transmitted, and no later than a position of a start or end symbol of the one SPS PDSCH indicated to be released.

In one embodiment, in response to the PDCCH indicating a joint release of a plurality of SPS PDSCHs:

the PDCCH is transmitted in one of slots in which the plurality of SPS PDSCH indicated to be jointly released are transmitted, or in a slot in which an SPS PDSCH with a smallest SPS configuration index or a largest SPS configuration index among the plurality of SPS PDSCHs is transmitted;

or, the PDCCH is transmitted in one of slots in which the plurality of SPS PDSCHs indicated to be jointly released are transmitted, and no later than a position of a start or end symbol of an SPS PDSCH contained in the one slot and indicated by the PDCCH to be released;

or, the PDCCH is transmitted no later than a position of a start or end symbol of an SPS PDSCH with a smallest SPS configuration index or a largest SPS configuration index among the plurality of SPS PDSCHs indicated to be jointly released in a slot in which the SPS PDSCH with the smallest SPS configuration index or the largest SPS configuration index is transmitted.

In one embodiment, in response to SPS PDSCHs indicated to be released by the PDCCH being contained in the slot, or in response to at least one of SPS PDSCHs indicated to be released by the PDCCH being contained in the slot, or in response to an SPS PDSCH with a smallest SPS configuration index or a largest SPS configuration index among SPS PDSCHs indicated to be released by the PDCCH being contained in the slot, determining that the terminal feeds back a hybrid automatic repeat request-acknowledgement information of the PDCCH and not to feed back a hybrid automatic repeat request-acknowledgement information of the predetermined SPS PDSCH among the SPS PDSCHs.

In one embodiment, in response to the PDCCH only indicating release of one SPS PDSCH:

the PDCCH is sent in a slot where the SPS PDSCH indicated to be released by the PDCCH is located, or the PDCCH is sent in a slot containing the SPS PDSCH indicated to be released by the PDCCH;

or, the PDCCH is sent earlier than a position of a start or end symbol of the SPS PDSCH in a slot where the SPS PDSCH indicated to be released by the PDCCH is located, or the PDCCH is sent later than a position of a start or end symbol of the SPS PDSCH in a slot where the SPS PDSCH indicated to be released by the PDCCH is located.

In one embodiment, in response to the PDCCH indicating joint release of a plurality of SPS PDSCHs:

the PDCCH is sent in a slot in which an SPS PDSCH with a smallest SPS configuration index or a largest SPS configuration index among the SPS PDSCHs indicated to be jointly released by the PDCCH is transmitted, or the PDCCH is sent in a slot containing an SPS PDSCH with a smallest SPS configuration index or a largest SPS configuration index among the SPS PDSCHs indicated to be jointly released by the PDCCH;

or, the PDCCH is sent earlier than a position of a start or end symbol of an SPS PDSCH with a smallest SPS configuration index or a largest SPS configuration index among the SPS PDSCHs indicated to be jointly released by the PDCCH in a slot in which the SPS PDSCH with the smallest SPS configuration index or the largest SPS configuration index is transmitted, or the PDCCH is sent later than a position of a start or end symbol of an SPS PDSCH with a smallest SPS configuration index or a largest SPS configuration index among the SPS PDSCHs indicated to be jointly released by the PDCCH in a slot in which the SPS PDSCH with the smallest SPS configuration index or the largest SPS configuration index is transmitted.

In one embodiment, the hybrid automatic repeat request-acknowledgement information of the PDCCH is mapped to a hybrid automatic repeat request-acknowledgement information position corresponding to the predetermined SPS PDSCH in a hybrid automatic repeat request-acknowledgement codebook for transmission.

In one embodiment, the SPS PDSCHs specifically include: an SPS PDSCH that needs feedback of hybrid automatic repeat request-acknowledgment information, and/or an SPS PDSCH determined not to collide with an uplink symbol according to a slot structure configured by high-layer signaling.

On the terminal side, an information communication apparatus according to an embodiment of the present application includes:

a memory configured to store program instructions;

a processor configured to invoke the program instructions stored in the memory and perform followings according to an obtained program:

determining to feed back a hybrid automatic repeat request-acknowledgement information of a Physical Downlink Control Channel, PDCCH that indicates Semi-Persistent Scheduling, SPS, resource release and not to feed back a hybrid automatic repeat request-acknowledgement information of a predetermined SPS Physical Downlink Shared Channel, PDSCH, among SPS PDSCHs, and the SPS PDSCHs and the PDCCH are in the same slot;

transmitting a hybrid automatic repeat request-acknowledgement sequence containing the hybrid automatic repeat request-acknowledgement information of the PDCCH.

In one embodiment, the determining to feed back a hybrid automatic repeat request-acknowledgement information of the PDCCH and not to feed back a hybrid automatic repeat request-acknowledgement information of a predetermined SPS PDSCH among the SPS PDSCHs, includes at least one of followings:

Case 1: for a terminal that supports receiving at most A unicast PDSCHs in one slot, in response to a PDCCH indicating SPS resource release being received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, and A is greater than 1, and B is less than or equal to A;

Case 2: for a terminal that supports receiving at most one unicast PDSCH in one slot, in response to a PDCCH indicating SPS resource release being received in a slot in which an SPS PDSCH needs to be received, determining to feed back a hybrid automatic repeat request-acknowledgement information of the PDCCH and not to feed back a hybrid automatic repeat request-acknowledgement information to the SPS PDSCH;

Case 3: in response to a hybrid automatic repeat request-acknowledgement information of the PDCCH and a hybrid automatic repeat request-acknowledgement information of the SPS PDSCHs needing to be transmitted in a same slot or sub-slot, determining to feed back a hybrid automatic repeat request-acknowledgement information of the PDCCH and not to feed back a hybrid automatic repeat request-acknowledgement information of a predetermined SPS PDSCH among the SPS PDSCHs;

Case 4: determining to feed back a hybrid automatic repeat request-acknowledgement information of the PDCCH and not to feed back a hybrid automatic repeat request-acknowledgement information of a predetermined SPS PDSCH among the SPS PDSCHs in response to one of following conditions being met:

a hybrid automatic repeat request-acknowledgement information of the PDCCH and a hybrid automatic repeat request-acknowledgement information of at least one SPS PDSCH are to be transmitted in a same slot or sub-slot, and the at least one SPS PDSCH is one SPS PDSCH of SPS PDSCHs indicated to be released by the PDCCH;

or, a hybrid automatic repeat request-acknowledgement information of the PDCCH and a hybrid automatic repeat request-acknowledgement information of at least one SPS PDSCH are to be transmitted in a same slot or sub-slot, and the at least one SPS PDSCH is transmitted in a slot in which the PDCCH is transmitted and is one SPS PDSCH of SPS PDSCHs indicated to be released by the PDCCH;

or, a hybrid automatic repeat request-acknowledgement information of the PDCCH and a hybrid automatic repeat request-acknowledgement information of the predetermined SPS PDSCH are to be transmitted in a same slot or sub-slot;

Case 5: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs having a same priority;

Case 6: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs being transmitted on a same carrier;

Case 7: determining to feed back a hybrid automatic repeat request-acknowledgement information of the PDCCH and not to feed back a hybrid automatic repeat request-acknowledgement information of a predetermined SPS PDSCH among the SPS PDSCHs in response to the terminal being configured with a semi-static hybrid automatic repeat request-acknowledgement information transmission mode;

Case 8: in response to there are C downlink transmission opportunities in the slot, and a PDCCH indicating SPS resource release is received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, and C is greater than or equal to 1, and B is less than or equal to C.

In one embodiment, the predetermined SPS PDSCH includes:

an SPS PDSCH with a smallest SPS configuration index or largest SPS configuration index among the SPS PDSCHs;

or, in response to the PDCCH only indicating a release of one SPS PDSCH, the predetermined SPS PDSCH is the one SPS PDSCH indicated to be released by the PDCCH;

or, in response to the PDCCH indicating a joint release of a plurality of SPS PDSCHs, the predetermined SPS PDSCH is an SPS PDSCH transmitted in the slot with a smallest SPS configuration index or largest SPS configuration index among the plurality of SPS PDSCHs indicated to be jointly released by the PDCCH, or an SPS PDSCH with a smallest SPS configuration index or largest SPS configuration index among the plurality of SPS PDSCHs indicated to be jointly released by the PDCCH.

In one embodiment, in response to the PDCCH only indicating release of one SPS PDSCH:

the PDCCH is transmitted in a slot in which the one SPS PDSCH indicated to be released is transmitted;

or, the PDCCH is transmitted in a slot in which the one SPS PDSCH indicated to be released is transmitted, and no later than a position of a start or end symbol of the one SPS PDSCH indicated to be released.

In one embodiment, in response to the PDCCH indicating a joint release of a plurality of SPS PDSCHs:

the PDCCH is transmitted in one of slots in which the plurality of SPS PDSCH indicated to be jointly released are transmitted, or in a slot in which an SPS PDSCH with a smallest SPS configuration index or a largest SPS configuration index among the plurality of SPS PDSCHs is transmitted;

or, the PDCCH is transmitted in one of slots in which the plurality of SPS PDSCHs indicated to be jointly released are transmitted, and no later than a position of a start or end symbol of an SPS PDSCH contained in the one slot and indicated by the PDCCH to be released;

or, the PDCCH is transmitted no later than a position of a start or end symbol of an SPS PDSCH with a smallest SPS configuration index or a largest SPS configuration index among the plurality of SPS PDSCHs indicated to be jointly released in a slot in which the SPS PDSCH with the smallest SPS configuration index or a largest SPS configuration index is transmitted.

In one embodiment, in response to SPS PDSCHs indicated to be released by the PDCCH being contained in the slot, or in response to at least one of SPS PDSCHs indicated to be released by the PDCCH being contained in the slot, or in response to an SPS PDSCH with a smallest SPS configuration index or a largest SPS configuration index among SPS PDSCHs indicated to be released by the PDCCH being contained in the slot, determining to feed back a hybrid automatic repeat request-acknowledgement information of the PDCCH and not to feed back a hybrid automatic repeat request-acknowledgement information of the predetermined SPS PDSCH among the SPS PDSCHs.

In one embodiment, in response to the PDCCH only indicating release of one SPS PDSCH:

a terminal does not expect the PDCCH not to be transmitted in a slot where the SPS PDSCH indicated to be released by the PDCCH is located, or does not expect the PDCCH to be transmitted in a slot that does not contain the SPS PDSCH indicated to be released by the PDCCH;

or, the terminal does not expect the PDCCH not to be transmitted earlier than a position of a start or end symbol of the SPS PDSCH in a slot where the SPS PDSCH indicated to be released by the PDCCH is located, or does not expect the PDCCH to be transmitted later than a position of a start or end symbol of the SPS PDSCH in a slot where the SPS PDSCH indicated to be released by the PDCCH is located.

In one embodiment, in response to the PDCCH indicating joint release of a plurality of SPS PDSCHs:

a terminal does not expect the PDCCH not to be transmitted in a slot in which an SPS PDSCH with a smallest SPS configuration index or a largest SPS configuration index among the SPS PDSCHs indicated to be jointly released by the PDCCH is transmitted, or the terminal does not expect the PDCCH to be transmitted in a slot that does not contain an SPS PDSCH with a smallest configuration index or a largest SPS configuration index among the SPS PDSCHs indicated to be jointly released by the PDCCH;

or, the terminal does not expect the PDCCH not to be transmitted earlier than a position of a start or end symbol of an SPS PDSCH with a smallest or largest SPS configuration index among the SPS PDSCHs indicated to be jointly released by the PDCCH in a slot in which the SPS PDSCH with the smallest or largest SPS configuration index is transmitted, or the terminal does not expect the PDCCH to be transmitted later than a position of a start or end symbol of an SPS PDSCH with a smallest or largest SPS configuration index among the SPS PDSCHs indicated to be jointly released by the PDCCH in a slot in which the SPS PDSCH with the smallest or largest SPS configuration index is transmitted.

In one embodiment, the hybrid automatic repeat request-acknowledgement information of the PDCCH is mapped to a hybrid automatic repeat request-acknowledgement information position corresponding to the predetermined SPS PDSCH in a hybrid automatic repeat request-acknowledgement codebook for transmission.

In one embodiment, the SPS PDSCHs include: an SPS PDSCH that needs feedback of hybrid automatic repeat request-acknowledgment information, and/or an SPS PDSCH determined not to collide with an uplink symbol according to a slot structure configured by high-layer signaling.

On the network side, an information transmission device provided by an embodiment of the present application includes:

a memory configured to store program instructions;

a processor configured to invoke the program instructions stored in the memory and execute according to an obtained program:

determining that a terminal feeds back a hybrid automatic repeat request-acknowledgement information of a PDCCH that indicates SPS resource release and does not feed back a hybrid automatic repeat request-acknowledgement information of a predetermined SPS PDSCH among SPS PDSCHs, and the SPS PDSCHs and the PDCCH are in the same slot;

receiving a hybrid automatic repeat request-acknowledgement sequence containing the hybrid automatic repeat request-acknowledgement information of the PDCCH.

In one embodiment, determining that the terminal feeds back a hybrid automatic repeat request-acknowledgement information to the PDCCH and does not feed back a hybrid automatic repeat request-acknowledgement information of a predetermined SPS PDSCH among the SPS PDSCHs, includes at least one of followings:

Case 1: for a terminal that supports receiving at most A unicast PDSCHs in one slot, in response to a PDCCH indicating SPS resource release being received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, and A is greater than 1, and B is less than or equal to A;

Case 2: for a terminal that supports receiving at most one unicast PDSCH in one slot, in response to a PDCCH indicating SPS resource release being received in a slot in which an SPS PDSCH needs to be received, determining to feed back a hybrid automatic repeat request-acknowledgement information of the PDCCH and not to feed back a hybrid automatic repeat request-acknowledgement information to the SPS PDSCH;

Case 3: in response to a hybrid automatic repeat request-acknowledgement information of the PDCCH and a hybrid automatic repeat request-acknowledgement information of the SPS PDSCHs needing to be transmitted in a same slot or sub-slot, determining to feed back a hybrid automatic repeat request-acknowledgement information of the PDCCH and not to feed back a hybrid automatic repeat request-acknowledgement information of a predetermined SPS PDSCH among the SPS PDSCHs;

Case 4: determining to feed back a hybrid automatic repeat request-acknowledgement information of the PDCCH and not to feed back a hybrid automatic repeat request-acknowledgement information of a predetermined SPS PDSCH among the SPS PDSCHs in response to one of following conditions being met:

a hybrid automatic repeat request-acknowledgement information of the PDCCH and a hybrid automatic repeat request-acknowledgement information of at least one SPS PDSCH are to be transmitted in a same slot or sub-slot, and the at least one SPS PDSCH is one SPS PDSCH of SPS PDSCHs indicated to be released by the PDCCH;

or, a hybrid automatic repeat request-acknowledgement information of the PDCCH and a hybrid automatic repeat request-acknowledgement information of at least one SPS PDSCH are to be transmitted in a same slot or sub-slot, and the at least one SPS PDSCH is transmitted in a slot in which the PDCCH is transmitted and is one SPS PDSCH of SPS PDSCHs indicated to be released by the PDCCH;

or, a hybrid automatic repeat request-acknowledgement information of the PDCCH and a hybrid automatic repeat request-acknowledgement information of the predetermined SPS PDSCH are to be transmitted in a same slot or sub-slot;

Case 5: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs having a same priority;

Case 6: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs being transmitted on a same carrier;

Case 7: determining to feed back a hybrid automatic repeat request-acknowledgement information of the PDCCH and not to feed back a hybrid automatic repeat request-acknowledgement information of a predetermined SPS PDSCH among the SPS PDSCHs in response to the terminal being configured with a semi-static hybrid automatic repeat request-acknowledgement information transmission mode;

Case 8: in response to there are C downlink transmission opportunities in the slot, and a PDCCH indicating SPS resource release is received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, and C is greater than or equal to 1, and B is less than or equal to C.

In one embodiment, the predetermined SPS PDSCH includes:

an SPS PDSCH with a smallest SPS configuration index or largest SPS configuration index among the SPS PDSCHs;

or, in response to the PDCCH only indicating a release of one SPS PDSCH, the predetermined SPS PDSCH is the one SPS PDSCH indicated to be released by the PDCCH;

or, in response to the PDCCH indicating a joint release of a plurality of SPS PDSCHs, the predetermined SPS PDSCH is an SPS PDSCH transmitted in the slot with a smallest SPS configuration index or largest SPS configuration index among the plurality of SPS PDSCHs indicated to be jointly released by the PDCCH, or an SPS PDSCH with a smallest SPS configuration index or largest SPS configuration index among the plurality of SPS PDSCHs indicated to be jointly released by the PDCCH.

In one embodiment, in response to the PDCCH only indicating release of one SPS PDSCH:

the PDCCH is transmitted in a slot in which the one SPS PDSCH indicated to be released is transmitted;

or, the PDCCH is transmitted in a slot in which the one SPS PDSCH indicated to be released is transmitted, and no later than a position of a start or end symbol of the one SPS PDSCH indicated to be released.

In one embodiment, in response to the PDCCH indicating joint release of a plurality of SPS PDSCHs:

the PDCCH is transmitted in one of slots in which the plurality of SPS PDSCH indicated to be jointly released are transmitted, or in a slot in which an SPS PDSCH with a smallest SPS configuration index or a largest SPS configuration index among the plurality of SPS PDSCHs is transmitted;

or, the PDCCH is transmitted in one of slots in which the plurality of SPS PDSCHs indicated to be jointly released are transmitted, and no later than a position of a start or end symbol of an SPS PDSCH contained in the one slot and indicated by the PDCCH to be released;

or, the PDCCH is transmitted no later than a position of a start or end symbol of an SPS PDSCH with a smallest SPS configuration index or a largest SPS configuration index among the plurality of SPS PDSCHs indicated to be jointly released in a slot in which the SPS PDSCH with the smallest SPS configuration index or a largest SPS configuration index is transmitted.

In one embodiment, in response to SPS PDSCHs indicated to be released by the PDCCH being contained in the slot, or in response to at least one of SPS PDSCHs indicated to be released by the PDCCH being contained in the slot, or in response to an SPS PDSCH with a smallest SPS configuration index or a largest SPS configuration index among SPS PDSCHs indicated to be released by the PDCCH being contained in the slot, determining that the terminal feeds back a hybrid automatic repeat request-acknowledgement information of the PDCCH and not to feed back a hybrid automatic repeat request-acknowledgement information of the predetermined SPS PDSCH among the SPS PDSCHs.

In one embodiment, in response to the PDCCH only indicating release of one SPS PDSCH:

the PDCCH is sent in a slot where the SPS PDSCH indicated to be released by the PDCCH is located, or the PDCCH is sent in a slot containing the SPS PDSCH indicated to be released by the PDCCH;

or, the PDCCH is sent earlier than a position of a start or end symbol of the SPS PDSCH in a slot where the SPS PDSCH indicated to be released by the PDCCH is located, or the PDCCH is sent later than a position of a start or end symbol of the SPS PDSCH in a slot where the SPS PDSCH indicated to be released by the PDCCH is located.

In one embodiment, in response to the PDCCH indicating a joint release of a plurality of SPS PDSCHs:

the PDCCH is sent in a slot in which an SPS PDSCH with a smallest SPS configuration index or a largest SPS configuration index among the SPS PDSCHs indicated to be jointly released by the PDCCH is transmitted, or the PDCCH is sent in a slot containing an SPS PDSCH with a smallest SPS configuration index or a largest SPS configuration index among the SPS PDSCHs indicated to be jointly released by the PDCCH;

or, the PDCCH is sent earlier than a position of a start or end symbol of an SPS PDSCH with a smallest SPS configuration index or a largest SPS configuration index among the SPS PDSCHs indicated to be jointly released by the PDCCH in a slot in which the SPS PDSCH with the smallest SPS configuration index or the largest SPS configuration index is transmitted, or the PDCCH is sent later than a position of a start or end symbol of an SPS PDSCH with a smallest SPS configuration index or a largest SPS configuration index among the SPS PDSCHs indicated to be jointly released by the PDCCH in a slot in which the SPS PDSCH with the smallest SPS configuration index or a largest SPS configuration index is transmitted.

In one embodiment, the hybrid automatic repeat request-acknowledgement information of the PDCCH is mapped to a hybrid automatic repeat request-acknowledgement information position corresponding to the predetermined SPS PDSCH in a hybrid automatic repeat request-acknowledgement codebook for transmission.

In one embodiment, the SPS PDSCHs include: an SPS PDSCH that needs feedback of hybrid automatic repeat request-acknowledgment information, and/or an SPS PDSCH determined not to collide with an uplink symbol according to a slot structure configured by high-layer signaling.

On the terminal side, another information transmission device provided by an embodiment of the present application includes:

a determining device configured to determine to feed back a hybrid automatic repeat request-acknowledgement information of a PDCCH that indicates SPS resource release and not to feed back a hybrid automatic repeat request-acknowledgement information of a predetermined SPS PDSCH, and the SPS PDSCHs and the PDCCH are in the same slot;

a sending device configured to transmit a hybrid automatic repeat request-acknowledgement sequence containing the hybrid automatic repeat request-acknowledgement information of the PDCCH.

On the network side, another information transmission device provided by an embodiment of the present application includes:

a determining device configured to determine that a terminal feeds back a hybrid automatic repeat request-acknowledgement information of a PDCCH that indicates SPS resource release and does not feed back a hybrid automatic repeat request-acknowledgement information of a predetermined SPS PDSCH among SPS PDSCHs, and the SPS PDSCHs and the PDCCH are in the same slot;

a receiving device configured to receive a hybrid automatic repeat request-acknowledgement sequence containing the hybrid automatic repeat request-acknowledgement information of the PDCCH.

Another embodiment of the present application provides a computing device, which includes a memory and a processor, and the memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the embodiments of the present application more clearly, the accompanying figures which need to be used in describing the embodiments will be introduced below briefly. The accompanying figures described below are only some embodiments of the present application, and other accompanying figures can also be obtained.

DETAILED DESCRIPTION OF THE EMBODIMENTS

The embodiments of the present application will be described clearly and completely below in combination with the accompanying drawings in the embodiments of the present application. The described embodiments are only a part of the embodiments of the present application but not all the embodiments.

Figures 1, 2:
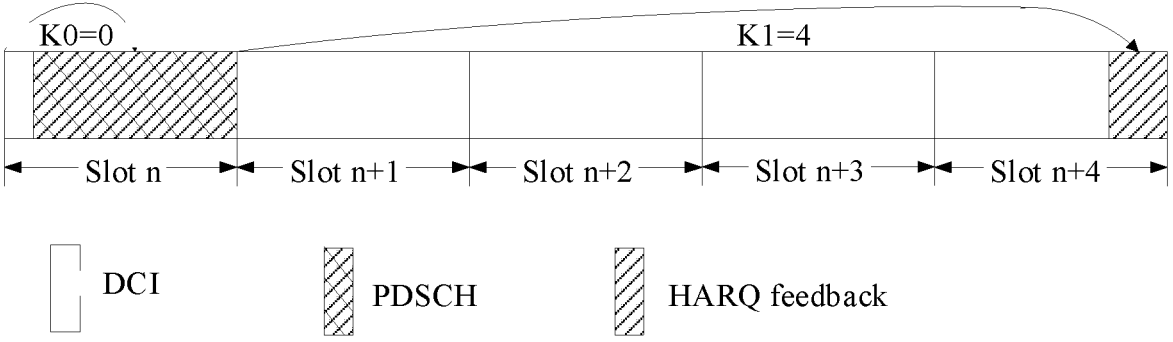
FIG. 1 is a schematic diagram of a downlink scheduling sequence and an HARQ-ACK feedback sequence according to an embodiment of the present application.
FIG. 2 is a schematic diagram of a set $M_{A,c}$ of HARQ-ACKs fed back correspondingly in slot n+9 if the K1 set is {2, 3, 4, 5, 6, 7, 8, 9} according to an embodiment of the present application.

The flexible timing relationship is supported in the new wireless communication system (i.e., 5G NR (5 Generation New RAT)). For the Physical Downlink Shared CHannel (PDSCH), the Physical Downlink Control CHannel (PDCCH) carrying its scheduling information indicates the scheduling timing relationship (Scheduling timing, i.e., K0) between the PDSCH and the PDCCH, and the feedback timing relationship (HARQ-ACK timing, i.e., K1) between the PDSCH and its corresponding HARQ-ACK. In one embodiment, the indication field of time domain resource allocation in the Downlink Control Information (DCI) format used by the PDCCH indicates the slot offset K0 between the slot where the PDSCH is located and the slot where the DCI is located; and the indication field of PDSCH to HARQ-ACK feedback timing in the DCI indicates the number K1 of slots between the end of the PDSCH and the beginning of HARQ-ACK, that is, the PDSCH transmitted in slot n performs the HARQ-ACK transmission in slot n+K1, as shown in FIG. 1. The full set of K1 is {0, 1, 2, 3, 4, 5, 6, 7, 8, 9, 10, 11, 12, 13, 14, 15}, and it is usually configured with up to 8 values for a terminal. In the Rel-15, the value of K1 is in units of slot, that is, K1=1 means that the spacing is one slot. In the Rel-16, the value of K1 may be in units of slot or sub-slot, and the sub-slot may be pre-configured with a length of 2 symbols (that is, there are 7 sub-slots in sequence in a slot) or 7 symbols (that is, there are 2 sub-slots in sequence in a slot).

Both semi-static and dynamic HARQ-ACK codebook generation methods are supported in the 5G NR system. The so-called HARQ-ACK codebook refers to an HARQ-ACK feedback sequence generated for the downlink transmission (including a PDSCH and a PDCCH indicating downlink SPS resource release, which may also be called SPS release PDCCH or SPS PDSCH release) of the HARQ-ACK feedback at the same time domain location or on an uplink channel.

The semi-static HARQ-ACK codebook is a set $M_{A,c}$ of downlink transmission opportunities corresponding to an uplink slot or sub-slot determined according to the K1 set, an allocation information table of downlink time domain resources (that is, a TDRA table or set, where each row in the table represents a time domain scheduling situation in which a starting symbol, the number of symbols, scheduling timing (i.e., K0) and other information may be provided) corresponding to each downlink carrier (on the activated BWP of the downlink carrier), semi-static uplink and downlink proportion (if the uplink and downlink proportion is configured), the number of PDSCH repeated transmissions (if the number of repeated transmissions is configured) and other parameters. This set of downlink transmission opportunities is semi-static and will not change with the specific scheduling situation. Thus, a set $M_{A,c}$ of downlink transmission opportunities on each downlink carrier corresponding to an uplink slot or sub-slot on the carrier transmitting the PUCCH can be uniquely determined according to the above parameters configured semi-statically, and the HARQ-ACK information sequence transmitted by each carrier correspondingly through the same PUCCH in an uplink slot or sub-slot on the carrier transmitting the PUCCH is determined according to $M_{A,c}$ of each carrier. Here, the sequence length is the number of elements in $M_{A,c}$ and the number of bits of the HARQ-ACK feedback corresponding to each transmission opportunity (element) itself, and the order of the HARQ-ACK feedback information is an order of positions of PDSCHs in $M_{A,c}$. In one embodiment, taking the case where the PUCCH is transmitted based on slot as an example, for each carrier c, a slot set corresponding to the HARQ-ACK feedback in slot n is determined according to each K1 value in the K1 set. In each slot in this slot set, the downlink transmission opportunity corresponding to each slot is determined according to whether the terminal supports receiving more than one unicast PDSCH in one slot; if the terminal supports receiving more than one unicast PDSCH in one slot, then the SLIVs are further divided into multiple groups according to the overlapping situation based on a predetermined rule, according to various time domain positions in the TDRA table (one time domain position may be called a SLIV, which expresses a combination of a start symbol and the number of transmission symbols), where each group may be considered to have a downlink transmission (this is because the overlapped SLIVs are simply to provide the scheduling flexibility, but only one of the SLIVs can be selected for use in the actual scheduling, and two PDSCHs will not be simultaneously scheduled to use the overlapped SLIVs), and to determine the maximum number of downlink transmissions that exist in TDM in a slot; if the terminal does not support receiving more than one unicast PDSCH in one slot, it is determined that one slot corresponds to one downlink transmission opportunity. If a semi-static uplink and downlink slot structure is configured and if there are uplink symbols in a symbol set included in the SLIV in a slot, the downlink transmission will not actually occur due to the conflict of uplink and downlink resources, so this SLIV can be removed from the SLIV set. Only when the symbols determined according to the allocation information of downlink time domain resources in a slot are all downlink or flexible symbols, it means that the downlink transmission can exist in this slot. If all SLIVs in a slot are removed, this slot will be removed. The $M_{A,c}$ corresponding to each carrier is obtained in the above manner, and the HARQ-ACK information sequence of the carrier c in slot n is determined according to $M_{A,c}$, including the size of the sequence and the specific content and order of HARQ-ACK; and finally, the HARQ-ACK information sequences corresponding to all carriers are concatenated together in the order of carrier numbers from small to large, to constitute an HARQ-ACK codebook transmitted by a terminal through a PUCCH in an uplink slot or sub-slot on a carrier transmitting the PUCCH.

In some embodiments, taking one carrier and one slot supporting transmission of only one unicast PDSCH as an example, it is assumed that the K1 set is {2, 3, 4, 5, 6, 7, 8, 9}, and then it is determined that the set $M_{A,c}$ of HARQ-ACKs fed back in slot n+9 correspondingly is as shown in FIG. 2, and the slots determined according to K1=5 and K1=6 are UL slots configured semi-statically with no downlink transmission, so these two slots are removed, thus reducing the redundant information in codebook.

The Semi-Persistent Scheduling (SPS) Physical Downlink Shared Channel (PDSCH) transmission and the PDSCH (that is, dynamic PDCSH) transmission with a corresponding Physical Downlink Control Channel (PDCCH)(that is, this PDSCH is scheduled by a PDCCH for transmission) are supported in the 5G NR system. When the SPS transmission is configured, the high-layer signaling may configure a corresponding RNTI (Radio Network Temporary Identity) (such as CS-RNTI) corresponding to the SPS accordingly, to scramble the PDCCH for activating and deactivating the SPS transmission. The high-layer signaling may also configure the transmission period of the SPS PDSCH accordingly. When there is a service that needs to perform the SPS transmission, the base station can activate the terminal to perform the SPS transmission according to the period of SPS configuration by sending a PDCCH indicating SPS activation, and the PDCCH indicating SPS activation includes related scheduling information such as frequency domain resource allocation, time domain resource allocation, MCS (Modulation and Coding Scheme), etc., to determine the transmission opportunity of the SPS PDSCH. When the SPS resource is no longer needed, the base station can release the previously-allocated SPS resource by sending a PDCCH indicating SPS release. In order to ensure that the base station can accurately know whether the PDCCH indicating SPS resource release (also called SPS PDSCH release) has been successfully received by the terminal, it is necessary to perform the HARQ-ACK feedback on the PDCCH indicating SPS resource release. That is, if the above set $M_{A,c}$ includes the PDCCH indicating SPS resource release, the HARQ-ACK codebook is HARQ-ACK containing the PDCCH indicating SPS resource release. In the R15, only one SPS configuration is configured for one terminal, and the minimum period of SPS is 10 ms, that is, the SPS transmission exists in at most one subframe among 10 subframes in a radio frame.

To sum up, in the R16, more than one SPS transmission is configured on one carrier (In one embodiment, on one BWP on one carrier), and the minimum period of each SPS may be 1 ms. When the SPS PDSCH transmissions corresponding to a plurality of SPS configurations exist on one carrier, the SPS PDSCH transmission corresponding to at least one SPS configuration may exist in each slot. For a terminal that only supports the ability to receive at most A (A is greater than 1) unicast PDSCHs in one slot, when A=1, there may be no slot to transmit the PDCCH indicating SPS resource release if the R15 mechanism is used (because R15 requires that the PDCCH indicating SPS resource release and the PDSCH cannot be transmitted in the same slot when only the ability to receive single unicast PDSCH in one slot is supported), and the PDCCH indicating SPS resource release cannot be delivered; for the case where A is greater than 1 (for example, A=2, 4, 7), R15 has no solution, because more than one SPS PDSCH and a PDCCH indicating SPS resource release will not exist in one slot at the same time in R15. In R16, if the HARQ-ACK feedback positions corresponding to A PDSCH transmission opportunities are only reserved in this slot, and if one or more PDCCHs indicating SPS resource release are further received in this slot when A SPS PDSCH transmissions have existed in this slot, there is no position in the HARQ-ACK feedback sequence to perform HARQ-ACK feedback on the PDCCH indicating SPS resource release in the semi-static HARQ-ACK codebook feedback mode. When A is greater than 1, one slot can contain more than one downlink transmission opportunity. Assuming that there are C downlink transmission opportunities, if there are already C SPS PDSCHs that occupy all downlink transmission opportunities for transmission, there is no position in the HARQ-ACK feedback sequence to perform HARQ-ACK feedback on a PDCCH indicating SPS resource release when the PDCCH indicating SPS resource release that also needs HARQ-ACK feedback appears in this slot, because the HARQ-ACK positions corresponding to this slot are reserved according to the number of downlink transmission opportunities.

Therefore, in Release 16 (R16), for the terminal that only supports the ability to receive at most A (A is greater than 1) unicast PDSCHs in one slot, if one or more PDCCHs indicating SPS resource release are received in a slot containing A SPS PDSCH transmissions, there is no clear method on how to perform HARQ-ACK feedback on the PDCCH indicating SPS resource release; and when A is greater than 1, if there are C downlink transmission opportunities in one slot, and if one or more PDCCHs indicating SPS resource release are received in the slot containing C SPS PDSCH transmissions, there is also no clear method on how to perform HARQ-ACK feedback on the PDCCH indicating SPS resource release. The embodiments of the present application provide information communication methods and apparatuses, and to realize the feedback of the hybrid automatic repeat request-acknowledgement information to the PDCCH when the PDCCH indicating SPS PDSCH release and the SPS PDSCH are transmitted in the same slot.

Here, the method and device are based on the same application concept. Since the principle of solving the problem in the method is similar to that in the device, the implementations of the device and method can refer to each other, and the repeated description thereof will be omitted.

The embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in the embodiments of the present application may be a device for providing the voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the RAN, and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber device, subscriber station, mobile station, mobile, remote station, access point, remote terminal, access terminal, user terminal, user agent, user device, which is not limited in the embodiments of the present application.

The network device involved in the embodiments of the present application may be a base station, which may include a plurality of cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, and the rest of the access network may include IP networks. The network device may further coordinate the attribute management of the air interface. For example, the network device involved in the embodiments of the present application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the present application.

The embodiments of the present application will be described below in detail with reference to the drawings of the specification. It should be noted that the showing order of the embodiments of the present application only represents the sequential order of the embodiments.

Terminal Side.

When the terminal adopts the semi-static HARQ-ACK codebook transmission (not limited to this), if a PDCCH indicating SPS resource release is received in a slot in which SPS PDSCHs need to be received, it is determined to feed back HARQ-ACK to the PDCCH indicating SPS resource release and not to feed back HARQ-ACK to a predetermined SPS PDSCH among the SPS PDSCHs, that is, the HARQ-ACK feedback position originally reserved for the predetermined SPS PDSCH in the HARQ-ACK codebook is used for the PDCCH indicating SPS resource release to feed back the HARQ-ACK of the PDCCH indicating SPS resource release, and ensuring that the HARQ-ACK of the PDCCH indicating SPS resource release can be provided in time.

Here, regarding the need to receive, for example, not all activated or configured SPSs are SPS PDSCHs mentioned here, but SPS PDSCHs are not SPSs that do not need to be received or do not need to perform HARQ-ACK feedback according to a specific rule; and the SPSs here are SPS PDSCHs determined to be received and to perform HARQ-ACK feedback according to the specific rule. For example, if a plurality of SPS PDSCHs are configured in a slot and the plurality of SPS PDSCHs overlap on time domain resources, the SPS that needs to be received is an SPS PDSCH with the smallest SPS configuration index among the overlapped SPS PDSCHs determined according to the overlapping rule, but not all SPS PDSCH are counted; for another example, if the reception of at most N1 unicast PDSCHs is supported in a slot and there are currently N2 (more than N1) SPS PDSCHs in the slot, then no more than N1 SPS PDSCHs are selected from N2 SPS PDSCHs as the SPS PDSCHs that need to be received in the order of SPS configuration index from small to large; for another example, a slot contains N2 SPS PDSCHs, and a symbol set where N3 SPS PDSCHs are located contains uplink symbols configured by the upper layer (that is, conflicts with the uplink symbols), so these SPS PDSCHs that conflict with the uplink symbols are not the SPS PDSCHs that need to be received, that is, the SPS PDSCHs obtained after removing N3 conflicting SPS PDSCHs from N2 SPS PDSCHs are the SPS PDSCHs that need to be received.

Base Station Side.

When the terminal is configured to adopt the semi-static HARQ-ACK codebook transmission (not limited to this), if a PDCCH indicating SPS resource release is sent in a slot in which SPS PDSCHs are sent to the terminal, it is determined that the terminal feeds back HARQ-ACK to the PDCCH indicating SPS resource release and does not feed back HARQ-ACK to a predetermined SPS PDSCH among the SPS PDSCHs.

In one embodiment, if a PDCCH indicating SPS resource release is received in a slot including transmission of SPS PDSCHs, it is determined to feed back HARQ-ACK to the PDCCH indicating SPS resource release and not to feed back HARQ-ACK to a predetermined SPS PDSCH among the SPS PDSCHs, further including at least one of:

Case 1: for a terminal that supports receiving at most A (A is greater than 1) unicast PDSCHs in one slot, if a PDCCH indicating SPS resource release is received in a slot containing transmission of B SPS PDSCHs, then it is determined to feed back HARQ-ACK to the PDCCH indicating SPS resource release and not to feed back HARQ-ACK to a predetermined SPS PDSCH among the B SPS PDSCHs, and B is less than A or B=A;

Case 2: for a terminal that supports receiving at most one unicast PDSCH in one slot, if a PDCCH indicating SPS resource release is received in a slot in which an SPS PDSCH needs to be received, then it is determined to feed back the hybrid automatic repeat request-acknowledgement information to the PDCCH and not to feed back the hybrid automatic repeat request-acknowledgement information to the SPS PDSCH;

Case 3: the PDCCH indicating SPS resource release and the SPS PDSCHs perform the HARQ-ACK transmission in a same slot or sub-slot (that is, the HARQ-ACK transmission is performed on the same PUCCH, that is, the PDCCH and the SPS PDSCHs correspond to the same K1 value, the same below); that is, when the above condition is satisfied, the above operation is performed (that is, when the HARQ-ACK transmission is performed on the same PUCCH, it is determined to feed back the hybrid automatic repeat request-acknowledgement information to the PDCCH and not to feed back the hybrid automatic repeat request-acknowledgement information to the predetermined SPS PDSCH among the SPS PDSCHs);

Case 4: the PDCCH indicating SPS resource release and at least one of the SPS PDSCHs indicated by the PDCCH to be released perform the HARQ-ACK transmission in a same slot or sub-slot, or the PDCCH indicating SPS resource release and at least one SPS PDSCH transmitted in a designated slot among the SPS PDSCHs indicated by the PDCCH to be released perform the HARQ-ACK transmission in a same slot or sub-slot, where the designated slot is a slot for transmitting SPS PDSCHs and the PDCCH indicating SPS resource release, or the PDCCH indicating SPS resource release and the predetermined SPS PDSCH perform the HARQ-ACK transmission in a same slot or sub-slot; that is, when one of the above conditions is satisfied, the above operation is performed: determining to feed back the hybrid automatic repeat request-acknowledgement information to the PDCCH and not to feed back the hybrid automatic repeat request-acknowledgement information to the predetermined SPS PDSCH among the SPS PDSCHs;

Case 5: the PDCCH indicating SPS resource release and the SPS PDSCHs have a same priority (that is, the HARQ-ACK codebook corresponding to the PDCCH indicating SPS resource release and the HARQ-ACK codebook corresponding to the SPS PDSCHs have a same priority, and the priority of the HARQ-ACK codebook corresponding to the PDCCH indicating SPS resource release is the priority of the HARQ-ACK codebook corresponding to the SPS PDSCHs released by the PDCCH indicating SPS resource release); that is, when the above condition is satisfied, the above operation is performed: determining to feed back the hybrid automatic repeat request-acknowledgement information to the PDCCH and not to feed back the hybrid automatic repeat request-acknowledgement information to the predetermined SPS PDSCH among the SPS PDSCHs;

Case 6: when the PDCCH (the PDCCH described herein, that is, the PDCCH indicating SPS resource release) and the SPS PDSCHs (that is, SPS PDSCHs transmitted in the same slot as the PDCCH) are transmitted on a same carrier, it is determined to feed back the hybrid automatic repeat request-acknowledgement information to the PDCCH and not to feed back the hybrid automatic repeat request-acknowledgement information to a predetermined SPS PDSCH among the SPS PDSCHs;

Case 7: when the terminal is configured to use a semi-static hybrid automatic repeat request-acknowledgement information transmission mode, it is determined to feed back the hybrid automatic repeat request-acknowledgement information to the PDCCH and not to feed back the hybrid automatic repeat request-acknowledgement information to a predetermined SPS PDSCH among the SPS PDSCHs;

Case 8: when there are C downlink transmission opportunities (which may also be referred to as candidate PDSCH transmission opportunities) in the slot, if a PDCCH indicating SPS resource release is received in a slot in which B SPS PDSCHs need to be received, then it is determined to feed back the hybrid automatic repeat request-acknowledgement information to the PDCCH and not to feed back the hybrid automatic repeat request-acknowledgement information to a pre-determined SPS PDSCH among the B SPS PDSCHs, and C is greater than or equal to 1, and B is less than or equal to C.

Figure 3:
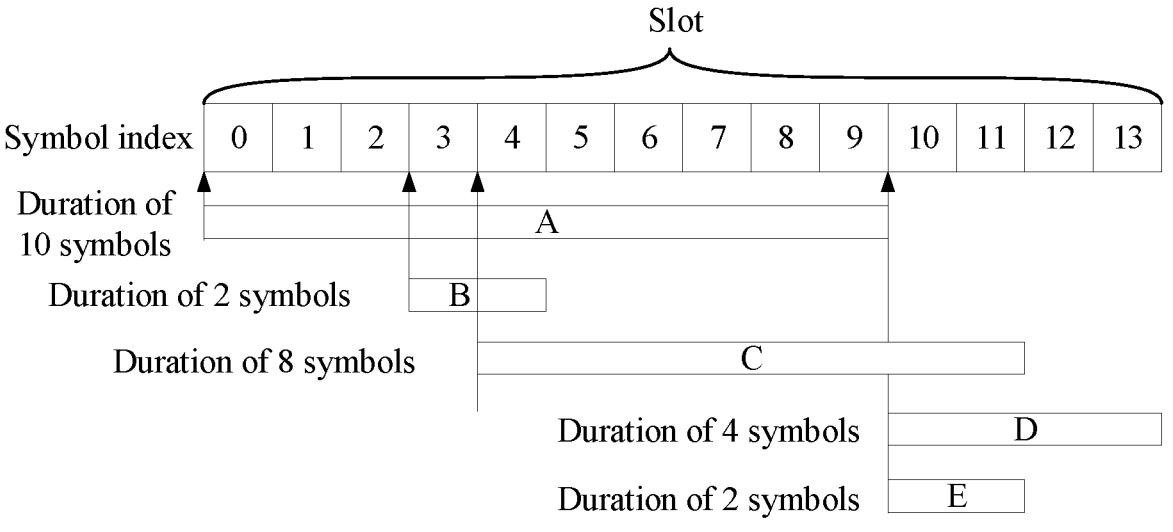
FIG. 3 is a schematic diagram of determining a downlink transmission opportunity in a slot according to the TDRA table according to an embodiment of the present application.

For example, referring to FIG. 3, a specific method for determining downlink transmission opportunities in a slot according to the TDRA table is as follows.

If the terminal does not support receiving more than one unicast PDSCH in one slot, it is determined that one slot corresponds to one downlink transmission opportunity. If the terminal supports receiving more than one unicast PDSCH in one slot, the SLIVs may be grouped based on a predetermined rule according to the SLIV set in the TDRA table, and the first SLIV with the earliest end position is found. Taking this SLIV as a benchmark, all SLIVs of which the start positions are before the end position of this SLIV are found, these SLIVs are taken as a group and correspond to a possible downlink transmission opportunity, and then these SLIVs are removed from the SLIV set. The above steps are repeated for the remaining SLIVs until all SLIVs contained in the TDRA table are processed, to obtain a plurality of downlink transmission opportunities. As shown in the figure below, the obtained result is that the elements A/B/C are a group and correspond to one downlink transmission opportunity, and the elements D/E are a group and correspond to one downlink transmission opportunity. A total of two downlink transmission opportunities are obtained, that is, there may be at most two PDSCH transmissions that do not overlap in this slot. Of course, there may be two PDSCHs or only one PDSCH in actual transmission, specifically depending on the SLIV assigned to the PDSCHs. For example, one PDSCH is assigned to use SLIV-C, and then all other SLIVs are unavailable because this SLIV overlaps with all other SLIVs. At this time, there is only one PDSCH. For another example, one PDSCH is assigned to use SLIV-B, and the other PDSCH is assigned to use SLIV-D. The two SLIVs do not overlap, and both PDSCHs can be transmitted. Since the semi-static HARQ-ACK needs to ensure the stability of the feedback bits without changing with the scheduling situation, the HARQ-ACK feedback positions are reserved according to the maximum number of downlink transmission opportunities for each slot when the semi-static HARQ-ACK is transmitted. There are actually several PDSCHs, and then the HARQ-ACKs of several PDSCHs can be mapped to the corresponding positions according to the corresponding SLIVs. If there is no position of HARQ-ACK received by the corresponding PDSCH, an NACK will be generated as a placeholder. In an example of the figure below, for this slot, it is equivalent to reserve two HARQ-ACK feedback positions in the semi-static HARQ-ACK feedback sequence. If there is actually only a PDSCH using one SLIV in A-E in this slot, it can be known which of two HARQ-ACK positions corresponding to this slot the HARQ-ACK of this PDSCH is mapped to, according to whether the SLIV used by this PDSCH belongs to the first group or the second group of SLIVs. For example, if this PDSCH uses one SLIV in A\B\C, the HARQ-ACK is mapped to the first HARQ-ACK position; if this PDSCH uses one SLIV in D\E, the HARQ-ACK is mapped to the second HARQ-ACK position. The number of bits of HARQ-ACK at each HARQ-ACK position is not necessarily 1 bit, but depends on the PDSCH transmission configuration on the current carrier. For example, the 2-TB transmission mode is configured without HARQ-ACK spatial bundling (that is, the operation of performing the logical AND between HARQ-ACKs of two TBs to obtain 1-bit HARQ-ACK), and then one HARQ-ACK position is 2-bit feedback, corresponding to each TB respectively. If the 1-TB transmission mode is configured, or the 2-TB transmission mode is configured and the HARQ-ACK spatial bundling is configured, then one HARQ-ACK position is 1-bit feedback. For another example, if the CBG-based transmission and feedback are configured, the number of bits of the HARQ-ACK feedback needs to be determined in combination with the number of CBGs into in which one TB is divided, and each CBG of each TB corresponds to 1-bit feedback.

The HARQ-ACK feedback position in the feedback sequence is determined based on the number of downlink transmission opportunities obtained by grouping the SLIVs in accordance with the above-mentioned SLIV grouping and the semi-static codebook. When there is a PDCCH indicating SPS resource release in a slot, this PDCCH also needs to perform HARQ-ACK feedback. Then, in order to obtain the position of the HARQ-ACK of this PDCCH in the HARQ-ACK feedback sequence, a reference SLIV is required. This SLIV selected as a reference may come from the TDRA table, and the HARQ-ACK positions in the HARQ-ACK feedback sequence are determined based on all available SLIVs in the TDRA table, which may also includes the reference SLIV corresponding to the PDCCH. Therefore, the PDCCH can definitely find the corresponding feedback position in the HARQ-ACK feedback sequence according to the reference SLIV. When the SLIV referenced by the PDCCH for determining its HARQ-ACK feedback position is the SLIV corresponding to one of SPS PDSCHs or overlaps with the SLIVs corresponding to the SPS PDSCHs or belongs to the same SLIV group as the SLIVs corresponding to the SPS PDSCHs (that is, corresponds to the index of the same downlink transmission opportunity), if the HARQ-ACK of the PDCCH is transmitted at the HARQ-ACK feedback position determined by this SLIV, the HARQ-ACK of the corresponding SPS PDSCH will not be transmitted, and other SPSs that do not conflict with the HARQ-ACK position borrowed by the PDCCH can still perform HARQ-ACK feedback normally. If there are a plurality of such PDCCHs, each PDCCH finds a corresponding HARQ-ACK feedback position through the above operation, and the HARQ-ACK feedback of one SPS PDSCH will be occupied and replaced.

In one embodiment, the HARQ-ACK of the PDCCH indicating SPS resource release is mapped to an HARQ-ACK position corresponding to the predetermined SPS PDSCH in the HARQ-ACK codebook.

In one embodiment, the predetermined SPS PDSCH includes:

an SPS PDSCH with a smallest or largest SPS configuration index among the SPS PDSCHs;

or, when the PDCCH indicating SPS resource release only indicates release of one SPS PDSCH, the predetermined SPS PDSCH is an SPS PDSCH indicated by the PDCCH indicating SPS resource release to be released;

or, when the PDCCH indicating SPS resource release indicates joint release of a plurality of SPS PDSCHs, the predetermined SPS PDSCH is an SPS PDSCH with a smallest or largest SPS configuration index among SPS PDSCHs transmitted in a designated slot among the plurality of SPS PDSCHs indicated by the PDCCH indicating SPS resource release to be jointly released, or an SPS PDSCH with a smallest or largest SPS configuration index among the plurality of SPS PDSCHs indicated by the PDCCH indicating SPS resource release to be jointly released.

In one embodiment, the SPS PDSCHs are SPS PDSCHs that need to perform HARQ-ACK feedback, that is, if there is a time-domain resource conflict between SPS PDSCHs, the SPS PDSCHs are SPS PDSCHs that need to be received by the terminal and to perform HARQ-ACK feedback after the conflict has been resolved, that is, the SPS PDSCHs are SPS PDSCHs that do not overlap in the time domain.

In one embodiment, the SPS PDSCHs are SPS PDSCHs determined not to collide with an uplink symbol according to a slot structure configured by high-layer signaling.

In one embodiment, regarding the PDCCH indicating SPS resource release:

When the PDCCH indicating SPS resource release only indicates the release of one SPS PDSCH:

the PDCCH indicating SPS resource release is transmitted in a slot in which the SPS PDSCH indicated to be released is transmitted, that is, the SPS PDSCH indicated by the PDCCH to be released is contained in the SPS PDSCHs;

or, the PDCCH indicating SPS resource release is transmitted no later than a position of a start or end symbol of the released SPS PDSCH in a slot in which the SPS PDSCH indicated to be released is transmitted.

When the PDCCH indicating SPS resource release indicates joint release of a plurality of SPS PDSCHs:

the PDCCH indicating SPS resource release is transmitted in one of slots in which the plurality of SPS PDSCH jointly released are transmitted, or in a slot in which an SPS PDSCH with a smallest or largest SPS configuration index among the plurality of SPS PDSCHs is transmitted;

or, the PDCCH indicating SPS resource release is transmitted no later than a position of a start or end symbol of an SPS PDSCH contained in the one slot and indicated by the PDCCH to be released in one of slots in which the plurality of SPS PDSCH indicated to be jointly released are transmitted; and: if there are a plurality of such SPS PDSCHs, the PDCCH is transmitted no later than the position of the start symbol of each SPS PDSCH, or no later than the position of the end symbol of each SPS PDSCH, or no later than the position of the start or end symbol of one of the SPS PDSCHs, and this one SPS PDSCH may be an SPS PDSCH with the largest or the smallest SPS configuration index among a plurality of SPS PDSCHs indicated by the PDCCH to be released in this slot;

or, the PDCCH indicating SPS resource release is transmitted no later than a position of a start or end symbol of an SPS PDSCH with a smallest or largest SPS configuration index among the plurality of SPS PDSCHs jointly released in a slot in which the SPS PDSCH with the smallest or largest SPS configuration index is transmitted.

In one embodiment, before performing the above operation (that is, determining to feed back the hybrid automatic repeat request-acknowledgement information to the PDCCH and not to feed back the hybrid automatic repeat request-acknowledgement information to the predetermined SPS PDSCH among the SPS PDSCHs), the terminal needs to determine whether the PDCCH indicating SPS resource release meets the condition:

the PDCCH indicating SPS resource release is received in a slot containing A SPS PDSCHs, and the SPS PDSCH indicated by this PDCCH to be released is contained in the A SPS PDSCHs;

or, at least one of SPS PDSCHs indicated by the PDCCH to be released (that is, a plurality of SPS PDSCHs indicated to be jointly released) is contained in the slot (that is, the SPS PDSCHs in this slot contain the SPS PDSCHs indicated by the PDCCH to be released);

or, an SPS PDSCH with the smallest or largest SPS configuration index among SPS PDSCHs indicated by the PDCCH to be released (that is, a plurality of SPS PDSCHs indicated to be jointly released) is contained in the slot (that is, the SPS PDSCHs in this slot contain the SPS PDSCH with the smallest or largest SPS configuration index among SPS PDSCHs indicated by the PDCCH to be released).

If so, it is determined to feed back the hybrid automatic repeat request-acknowledgement information to the PDCCH and not to feed back the hybrid automatic repeat request-acknowledgement information to the predetermined SPS PDSCH among the SPS PDSCHs; if not, it is considered to be wrong scheduling, and then the following operation is further performed.

If the PDCCH only indicates release of one SPS PDSCH:

the PDCCH is sent in a slot where the SPS PDSCH indicated by the PDCCH to be released is located, or the PDCCH is sent in a slot containing the SPS PDSCH indicated by the PDCCH to be released;

or, the PDCCH is sent earlier than a position of a start or end symbol of the SPS PDSCH in a slot where the SPS PDSCH indicated by the PDCCH to be released is located, or the PDCCH is sent later than a position of a start or end symbol of the SPS PDSCH in a slot where the SPS PDSCH indicated by the PDCCH to be released is located.

That is, when the PDCCH indicating SPS resource release only indicates the release of one SPS PDSCH:

the terminal does not expect the PDCCH indicating SPS resource release not to be transmitted in a slot where the SPS PDSCH indicated to be released is located, or the terminal does not expect the PDCCH indicating SPS resource release to be transmitted in a slot that does not contain the SPS PDSCH indicated to be released (the premise of this condition is that there is SPS in the current slot; if there is no SPS transmission in the current slot, the PDCCH indicating SPS resource release can be sent, the same below);

or, the terminal does not expect the PDCCH indicating SPS resource release not to be transmitted earlier than a position of a start or end symbol of the SPS PDSCH in a slot where the SPS PDSCH indicated to be released is located, or the terminal does not expect the PDCCH indicating SPS resource release to be transmitted later than a position of a start or end symbol of the SPS PDSCH in a slot where the SPS PDSCH indicated to be released is located.

If the PDCCH indicates joint release of a plurality of SPS PDSCHs:

the PDCCH is sent in a slot in which an SPS PDSCH with a smallest or largest SPS configuration index among the SPS PDSCHs indicated by the PDCCH to be jointly released is transmitted, or the PDCCH is sent in a slot containing an SPS PDSCH with a smallest or largest SPS configuration index among the SPS PDSCHs indicated by the PDCCH to be jointly released;

or, the PDCCH is sent earlier than a position of a start or end symbol of an SPS PDSCH with a smallest or largest SPS configuration index among the SPS PDSCHs indicated by the PDCCH to be jointly released in a slot in which the SPS PDSCH with the smallest or largest SPS configuration index is transmitted, or the PDCCH is sent later than a position of a start or end symbol of an SPS PDSCH with a smallest or largest SPS configuration index among the SPS PDSCHs indicated by the PDCCH to be jointly released in a slot in which the SPS PDSCH with the smallest or largest SPS configuration index is transmitted.

That is, when the PDCCH indicating SPS resource release indicates joint release of a plurality of SPS PDSCHs:

the terminal does not expect the PDCCH indicating SPS resource release not to be transmitted in a slot in which an SPS PDSCH with a smallest or largest SPS configuration index among the SPS PDSCHs indicated to be jointly released is transmitted, or the terminal does not expect the PDCCH indicating SPS resource release to be transmitted in a slot that does not contain an SPS PDSCH with a smallest or largest SPS configuration index among the SPS PDSCHs indicated to be jointly released;

or, the terminal does not expect the PDCCH indicating SPS resource release not to be transmitted earlier than a position of a start or end symbol of an SPS PDSCH with a smallest or largest SPS configuration index among the SPS PDSCHs indicated to be jointly released in a slot in which the SPS PDSCH with the smallest or largest SPS configuration index is transmitted, or the terminal does not expect the PDCCH indicating SPS resource release to be transmitted later than a position of a start or end symbol of an SPS PDSCH with a smallest or largest SPS configuration index among the SPS PDSCHs indicated to be jointly released in a slot in which the SPS PDSCH with the smallest or largest SPS configuration index is transmitted.

It should be noted that the minimum and maximum described in the embodiments of the present application correspond to each other, that is, the slot in which the predetermined SPS PDSCH and the PDCCH indicating SPS resource release are transmitted is determined according to the minimum SPS configuration mode, which is also the minimum SPS configuration here. If the slot in which the predetermined SPS PDSCH and the PDCCH indicating SPS resource release are transmitted is determined according to the maximum SPS configuration mode, this is also the maximum SPS configuration.

A specific embodiment will be given below for illustration.

Embodiment

Figure 4:
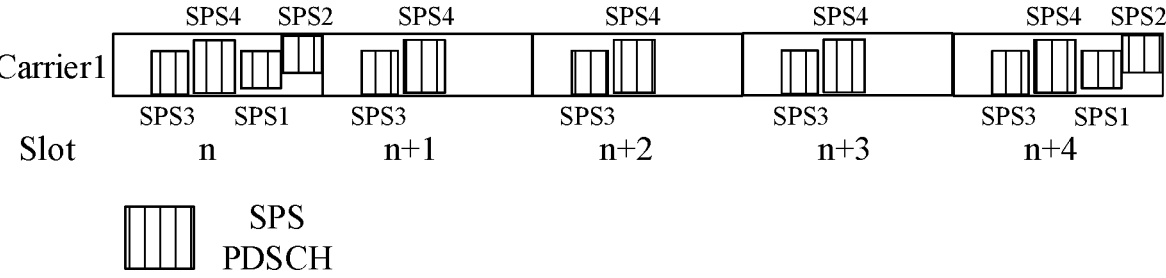
FIG. 4 is a schematic diagram in which a terminal is configured with 4 SPS configurations according to an embodiment of the present application, where the SPS configurations 1 and 2 have a period of 5 ms and are transmitted in slots 1 and 6 respectively, and the SPS configuration 3 and 4 have a period of 1 ms.

Assuming that the terminal is configured with 4 SPS configurations, the SPS configurations 1 and 2 have a period of 5 ms and are transmitted in slots 1 and 6 respectively, and the SPS configuration 3 and 4 have a period of 1 ms, as shown in FIG. 4. The semi-static HARQ-ACK codebook is used, and: for simplicity, it is assumed that the K1 set={1, 2}, and it is assumed that the terminal has the ability of receiving at most 4 unicast PDSCHs in one slot, that is, one downlink slot corresponding to the HARQ-ACK codebook in one HARQ-ACK feedback slot may correspond to the feedback information of at most 4 PDSCHs. For simplicity, it is assumed that the feedback information of each PDSCH is 1 bit, and it is assumed that the PDCCH indicating SPS resource release has the same priority as that of the HARQ-ACK feedback of each SPS, then:

Case 1: the base station side sends a PDCCH that jointly indicates the resource release of SPS1 and SPS2 (In one embodiment, PDSCHs corresponding to SPS configuration 1 and configuration 2) in slot n, and indicates K1=1 of this PDCCH. It is assumed that each SPS PDSCH corresponds to K1=1, that is, 4 SPSs and one PDCCH indicating SPS resource release in slot n all perform HARQ-ACK feedback in slot n+1, and the PDCCH indicating SPS resource release is transmitted in the slot in which the SPS indicated to be released is transmitted. At this time, one slot supports the HARQ-ACK feedback of A=4 PDSCHs at most, and at this time, B=4 SPSs and one PDCCH indicating SPS resource release all need to perform the HARQ-ACK feedback in the same slot, so the terminal, when receiving the PDCCH indicating SPS resource release in slot n including transmission of B=4 SPSs, determines to perform the HARQ-ACK feedback on the PDCCH in slot n+1, and maps the HARQ-ACK feedback to the HARQ-ACK position originally corresponding to SPS1 in the HARQ-ACK codebook in slot n+1, and determines not to feed back HARQ-ACK to the SPS1 in slot n in slot n+1, that is, it is considered that this SPS1 has been released. In slot n+1, it is also possible to continue to map the HARQ-ACKs of the SPS3 and SPS4 to the corresponding positions in the HARQ-ACK codebook for feedback. Although the SPS2 is also released at the same time, in order not to change the size of the codebook, the HARQ-ACK feedback position corresponding to the SPS2 is still in the HARQ-ACK codebook. At this position, the terminal can choose to continue to map the HARQ-ACK of the SPS2. Of course, it is also possible to choose to map to NACK for occupancy (for example, after the PDCCH indicating release is received, the SPS2 will not be received, so there is no real HARQ-ACK feedback for the SPS2) to perform HARQ-ACK feedback. The base station can determine what information is included in the HARQ-ACK codebook in slot n+1 and the position of the PDCCH indicating SPS resource release in the codebook in the same manner as the terminal side described above, and to obtain the corresponding feedback information to determine whether the release is successful;

Case 2: the base station side sends a PDCCH that jointly indicates the resource release of SPS1 and SPS2 in slot n, and indicates K1=1 of this PDCCH. It is assumed that each SPS PDSCH corresponds to K1=2, that is, 4 SPSs in slot n perform HARQ-ACK feedback in slot n+2, while one PDCCH indicating SPS resource release in slot n performs HARQ-ACK feedback in slot n+1, and the PDCCH indicating SPS resource release is transmitted in the slot in which the SPS indicated to be released is transmitted. At this time, one slot supports the HARQ-ACK feedback of A=4 PDSCHs at most. Although there are B=4 SPSs and one PDCCH indicating SPS resource release in slot n+1 at the same time, the SPSs and the PDCCH indicating SPS resource release perform HARQ-ACK feedback in different slots, so the 4-bit HARQ-ACK transmission of 4 SPSs in slot n in slot n+2 will not be affected. Thus, the terminal can perform the HARQ-ACK feedback on the PDCCH in slot n+1, and feed back HARQ-ACKs to 4 SPSs in slot n according to the normal process in slot n+2. Here, if the SPS and other dynamically-scheduled HARQ-ACK perform multiplexed transmission in the slot n+2, the HARQ-ACK codebook is generated and transmitted according to the semi-static codebook generation method, that is, the occupancy information will be transmitted, regardless of whether the SPS is released or not. If no other dynamically-scheduled HARQ-ACK is multiplexed with the HARQ-ACK of SPS for transmission in slot n+2, that is, the HARQ-ACK feedback of SPS only is in slot n+2, one implementation is still to generate 4-bit HARQ-ACK according to 4 SPSs, and the other implementation is that it is only necessary to generate HARQ-ACK transmission for SPS3 and SPS4 if it has been determined that SPS1 and SPS2 have been released. The base station can determine what information is included in the HARQ-ACK codebook in slot n+1 and the position of the PDCCH indicating SPS resource release in the codebook in the same manner as the terminal side described above, and to obtain the corresponding feedback information to determine whether the release is successful. Here, for the case where HARQ-ACKs are only fed back to SPS3 and SPS4 in slot n+2, the base station can confirm the successful release for ACK according to the feedback information of the PDCCH indicating SPS resource release received in slot n+1, and to confirm that only the feedback information of SPS3 and SPS4 is contained in slot n+2;

Case 3: the base station side sends a PDCCH indicating the resource release of SPS3 in slot n+1, and indicates K1=1 of this PDCCH. It is assumed that each SPS PDSCH corresponds to K1=1, that is, 2 SPSs and one PDCCH indicating SPS resource release in slot n+1 all perform HARQ-ACK feedback in slot n+2, and the PDCCH indicating SPS resource release is transmitted in the slot in which the SPS indicated to be released is transmitted. At this time, one slot supports the HARQ-ACK feedback of A=4 PDSCHs at most, and B=2 SPSs and one PDCCH indicating SPS resource release existing in slot n+2 all need to perform HARQ-ACK feedback in a same slot. Although the total number of downlink transmissions to be fed back in slot n+2 does not exceed A=4, the position of the HARQ-ACK feedback is determined by reference to the SLIV of the SPS indicated to be released when the HARQ-ACK feedback is performed on the PDCCH indicating SPS resource release, so the HARQ-ACK position of the PDCCH indicating the resource release of SPS3 is in conflict with SPS3 itself. Therefore, the terminal determines to perform the HARQ-ACK feedback on the PDCCH in slot n+2, and maps the HARQ-ACK feedback to the HARQ-ACK position originally corresponding to SPS3 in the HARQ-ACK codebook in slot n+2, and determines not to feed back HARQ-ACK to the SPS3 in slot n+1 in slot n+2, that is, it is considered that this SPS3 has been released. In slot n+2, it is also possible to continue to map the HARQ-ACK of the SPS4 to the corresponding position in the HARQ-ACK codebook for feedback. The base station can determine what information is included in the HARQ-ACK codebook in slot n+2 and the position of the PDCCH indicating SPS resource release in the codebook in the same manner as the terminal side described above, and to obtain the corresponding feedback information to determine whether the release is successful.

In the above embodiment, the values of A and B may also be ignored. As long as there is a PDCCH indicating SPS resource release in the same slot as the SPS, the HARQ-ACK is fed back to the PDCCH indicating SPS resource release, and the HARQ-ACK of one SPS among the SPS PDSCHs is stopped, and giving way to the HARQ-ACK feedback to the PDCCH indicating SPS resource release.

In the above embodiment, if the PDCCH indicating SPS resource release only releases one SPS, for example, only releases SPS1, the processing method is the same as above and will not be repeated.

In the above embodiment, if it is assumed that SPS1 and SPS2 have a period of 4 ms and are transmitted in slots n, n+4, n+8, etc., and SPS3 and SPS4 have a period of 2 ms and are transmitted in slots n, n+2, n+4, etc., then the PDCCH indicating SPS resource release can also be transmitted in slot n+1. At this time, the PDCCH indicating SPS resource release is not transmitted in the same slot as any SPS, it is not necessary to feed back the HARQ-ACK of the PDCCH indicating SPS resource release by occupying the HARQ-ACK position corresponding to an SPS in the semi-static codebook, so the feedback can be performed according to the semi-static codebook method in the prior art. That is, if the HARQ-ACK of the SPS and the HARQ-ACK of the PDCCH indicating SPS resource release are transmitted in the same slot, there are HARQ-ACK positions corresponding respectively to slots in which the SPS and the PDCCH indicating SPS resource release are transmitted in the HARQ-ACK codebook, and the HARQ-ACKs are respectively mapped to the corresponding positions. If the HARQ-ACK of the SPS and the HARQ-ACK of the PDCCH indicating SPS resource release are not transmitted in the same slot, then the same as the above method 2, the HARQ-ACKs are respectively transmitted in the HARQ-ACK codebooks on different PUCCHs, and the HARQ-ACK transmissions of the SPS and the PDCCH indicating SPS resource release do not collide with each other.

In the above embodiment, if it is assumed that there is only one SPS1 in each slot, that is, the period of SPS1 is 1 ms, or it is assumed that there are a plurality of SPS configurations, for example, SPS1 has a period of 2 ms and is transmitted in slots n, n+2, n+4, etc., SPS2 has a period of 2 ms and is transmitted in slots n+1, n+3, n+6, etc., and the ability to receive the unicast PDSCH in one slot is 1, the above method is also applicable. That is, according to the method 1, if there is a PDCCH indicating the resource release of SPS1 in slot n and both this PDCCH and the SPS1 perform HARQ-ACK in slot n+1, then the HARQ-ACK of the PDCCH indicating SPS resource release is transmitted in slot n+1 and mapped to the position corresponding to the SPS1 in the HARQ-ACK codebook, and the HARQ-ACK corresponding to the SPS1 is not transmitted. According to the method 2, if there is a PDCCH indicating the resource release of SPS1 in slot n and the SPS1 feeds back HARQ-ACK in slot n+2 while the PDCCH indicating the resource release of SPS1 feeds back HARQ-ACK in slot n+1, then the feedback information of the PDCCH and the feedback information of the SPS1 can be transmitted in different slots respectively without replacement. If the SPS1 performs HARQ-ACK feedback of SPS only in slot n+2, and if the SPS1 has been released, the HARQ-ACK feedback thereof may not be performed; and the same is true for the corresponding receiving method of the base station.

In the above embodiment, if the value A of the above unicast receiving capability is replaced by the number C of downlink transmission opportunities in one slot, the same is applicable.

It should be noted that only the HARQ-ACK feedback based on slot is taken as an example (that is, the unit of K1 is slot) in the above embodiment, and the above method is also applicable to the HARQ-ACK feedback based on sub-slot (that is, the unit of K1 is sub-slot); in the above embodiment, when the K1 set contains more values, only the set of downlink transmission opportunities corresponding to the HARQ-ACK codebook in one uplink slot is affected to expand from one slot to multiple slots. In each slot containing SPS transmission, the above method is also applicable if there is a PDCCH indicating SPS resource release.

In conclusion, when released SPSs and a PDCCH indicating SPS resource release exist in the same slot, no HARQ-ACK feedback is performed for one of the released SPSs, but the HARQ-ACK of the PDCCH indicating SPS resource release is fed back. That is, the embodiment of the present application provides the HARQ-ACK communication method in which no HARQ-ACK feedback is performed for one of released SPSs but the HARQ-ACK of the PDCCH indicating SPS resource release is fed back when the released SPSs and the PDCCH indicating SPS resource release exist in the same slot, to solve the problem of no method to feed back HARQ-ACK to the PDCCH indicating SPS resource release when multiple SPS configurations are supported.

Figure 5:
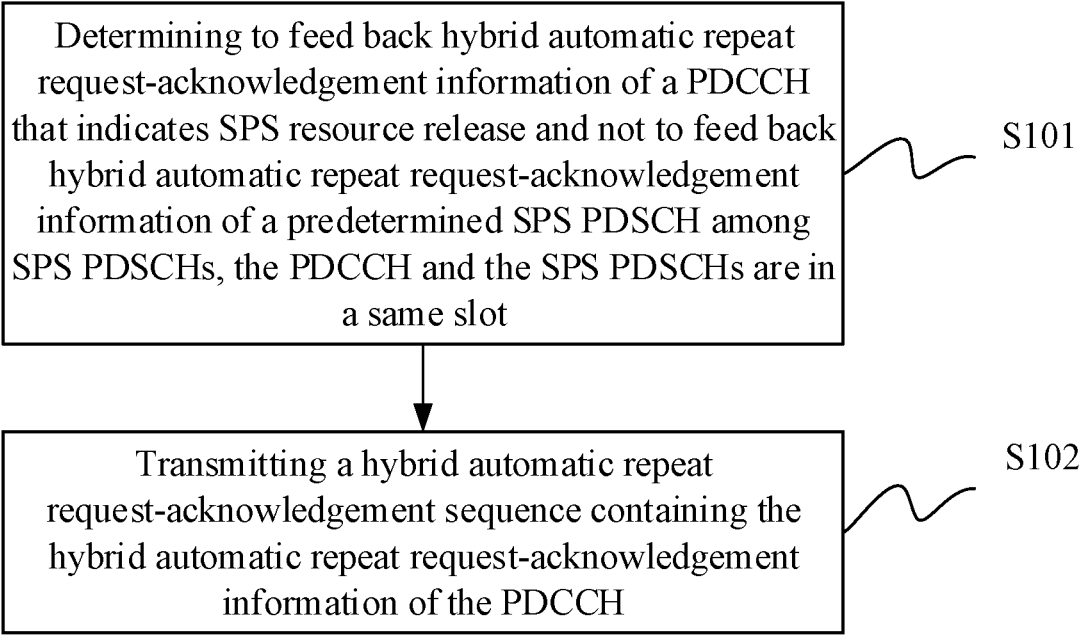
FIG. 5 is a schematic flowchart of an information communication method on the terminal side according to an embodiment of the present application.

On the terminal side, referring to FIG. 5, an information communication method according to an embodiment of the present application includes:

S101: determining to feed back hybrid automatic repeat request-acknowledgement information to a PDCCH that indicates SPS resource release and not to feed back hybrid automatic repeat request-acknowledgement information of a predetermined SPS PDSCH among SPS PDSCHs when receiving the PDCCH in a slot in which the SPS PDSCHs need to be received;

S102: transmitting a hybrid automatic repeat request-acknowledgement sequence containing the hybrid automatic repeat request-acknowledgement information of the PDCCH.

In one embodiment, determining to feed back hybrid automatic repeat request-acknowledgement information of the PDCCH and not to feed back hybrid automatic repeat request-acknowledgement information of a predetermined SPS PDSCH among the SPS PDSCHs, specifically includes one or a combination of:

Case 1: for a terminal that supports receiving at most A unicast PDSCHs in one slot, if a PDCCH indicating SPS resource release is received in a slot in which B SPS PDSCHs need to be received, then determining to feed back hybrid automatic repeat request-acknowledgement information of the PDCCH and not to feed back hybrid automatic repeat request-acknowledgement information of a predetermined SPS PDSCH among the B SPS PDSCHs, and A is greater than 1, and B is less than or equal to A;

Case 2: for a terminal that supports receiving at most one unicast PDSCH in one slot, if a PDCCH indicating SPS resource release is received in a slot in which an SPS PDSCH needs to be received, then determining to feed back hybrid automatic repeat request-acknowledgement information of the PDCCH and not to feed back hybrid automatic repeat request-acknowledgement information to the SPS PDSCH;

Case 3: in response to a hybrid automatic repeat request-acknowledgement information of the PDCCH and a hybrid automatic repeat request-acknowledgement information of the SPS PDSCHs needing to be transmitted in a same slot or sub-slot, determining to feed back hybrid automatic repeat request-acknowledgement information of the PDCCH and not to feed back hybrid automatic repeat request-acknowledgement information of a predetermined SPS PDSCH among the SPS PDSCHs;

Case 4: determining to feed back hybrid automatic repeat request-acknowledgement information of the PDCCH and not to feed back hybrid automatic repeat request-acknowledgement information of a predetermined SPS PDSCH among the SPS PDSCHs when one of following conditions is met:

hybrid automatic repeat request-acknowledgement information is transmitted to the PDCCH and at least one of SPS PDSCHs indicated by the PDCCH to be released in a same slot or sub-slot;

or, hybrid automatic repeat request-acknowledgement information is transmitted to the PDCCH and at least one SPS PDSCH transmitted in a slot in which the PDCCH is transmitted among SPS PDSCHs indicated by the PDCCH to be released in a same slot or sub-slot;

or, hybrid automatic repeat request-acknowledgement information is transmitted to the PDCCH and the predetermined SPS PDSCH in a same slot or sub-slot;

Case 5: determining to feed back hybrid automatic repeat request-acknowledgement information of the PDCCH and not to feed back hybrid automatic repeat request-acknowledgement information of a predetermined SPS PDSCH among the SPS PDSCHs when the PDCCH and the SPS PDSCHs have a same priority;

Case 6: determining to feed back hybrid automatic repeat request-acknowledgement information of the PDCCH and not to feed back hybrid automatic repeat request-acknowledgement information of a predetermined SPS PDSCH among the SPS PDSCHs when the PDCCH and the SPS PDSCHs are transmitted on a same carrier;

Case 7: determining to feed back hybrid automatic repeat request-acknowledgement information of the PDCCH and not to feed back hybrid automatic repeat request-acknowledgement information of a predetermined SPS PDSCH among the SPS PDSCHs when the terminal is configured to use a semi-static hybrid automatic repeat request-acknowledgement information transmission mode;

Case 8: when there are C downlink transmission opportunities in the slot, if a PDCCH indicating SPS resource release is received in a slot in which B SPS PDSCHs need to be received, then determining to feed back hybrid automatic repeat request-acknowledgement information of the PDCCH and not to feed back hybrid automatic repeat request-acknowledgement information of a predetermined SPS PDSCH among the B SPS PDSCHs, and C is greater than or equal to 1, and B is less than or equal to C.

In one embodiment, the predetermined SPS PDSCH includes:

an SPS PDSCH with a smallest or largest SPS configuration index among the SPS PDSCHs;

or, when the PDCCH only indicates release of one SPS PDSCH, the predetermined SPS PDSCH is an SPS PDSCH indicated by the PDCCH to be released;

or, when the PDCCH indicates joint release of a plurality of SPS PDSCHs, the predetermined SPS PDSCH is an SPS PDSCH with a smallest or largest SPS configuration index among SPS PDSCHs transmitted in the slot among the plurality of SPS PDSCHs indicated by the PDCCH to be jointly released, or an SPS PDSCH with a smallest or largest SPS configuration index among the plurality of SPS PDSCHs indicated by the PDCCH to be jointly released.

In one embodiment, when the PDCCH only indicates release of one SPS PDSCH:

the PDCCH is transmitted in a slot in which the SPS PDSCH indicated to be released is transmitted;

or, the PDCCH is transmitted no later than a position of a start or end symbol of the released SPS PDSCH in a slot in which the SPS PDSCH indicated to be released is transmitted.

In one embodiment, when the PDCCH indicates joint release of a plurality of SPS PDSCHs:

the PDCCH is transmitted in one of slots in which the plurality of SPS PDSCH indicated to be jointly released are transmitted, or in a slot in which an SPS PDSCH with a smallest or largest SPS configuration index among the plurality of SPS PDSCHs is transmitted;

or, the PDCCH is transmitted no later than a position of a start or end symbol of an SPS PDSCH contained in the one slot and indicated by the PDCCH to be released in one of slots in which the plurality of SPS PDSCH indicated to be jointly released are transmitted;

or, the PDCCH is transmitted no later than a position of a start or end symbol of an SPS PDSCH with a smallest or largest SPS configuration index among the plurality of SPS PDSCHs indicated to be jointly released in a slot in which the SPS PDSCH with the smallest or largest SPS configuration index is transmitted.

In one embodiment, when SPS PDSCHs indicated by the PDCCH to be released are contained in the slot, or when at least one of SPS PDSCHs indicated by the PDCCH to be released is contained in the slot, or when an SPS PDSCH with a smallest or largest SPS configuration index among SPS PDSCHs indicated by the PDCCH to be released is contained in the slot, it is determined to feed back hybrid automatic repeat request-acknowledgement information of the PDCCH and not to feed back hybrid automatic repeat request-acknowledgement information to the predetermined SPS PDSCH among the SPS PDSCHs.

In one embodiment, if the PDCCH only indicates release of one SPS PDSCH:

a terminal does not expect the PDCCH not to be transmitted in a slot where the SPS PDSCH indicated to be released is located, or does not expect the PDCCH to be transmitted in a slot that does not contain the SPS PDSCH indicated to be released;

or, the terminal does not expect the PDCCH not to be transmitted earlier than a position of a start or end symbol of the SPS PDSCH in a slot where the SPS PDSCH indicated to be released is located, or does not expect the PDCCH to be transmitted later than a position of a start or end symbol of the SPS PDSCH in a slot where the SPS PDSCH indicated to be released is located.

In one embodiment, if the PDCCH indicates joint release of a plurality of SPS PDSCHs:

a terminal does not expect the PDCCH not to be transmitted in a slot in which an SPS PDSCH with a smallest or largest SPS configuration index among the SPS PDSCHs indicated to be jointly released is transmitted, or the terminal does not expect the PDCCH to be transmitted in a slot that does not contain an SPS PDSCH with a smallest or largest SPS configuration index among the SPS PDSCHs indicated to be jointly released;

or, the terminal does not expect the PDCCH not to be transmitted earlier than a position of a start or end symbol of an SPS PDSCH with a smallest or largest SPS configuration index among the SPS PDSCHs indicated to be jointly released in a slot in which the SPS PDSCH with the smallest or largest SPS configuration index is transmitted, or the terminal does not expect the PDCCH to be transmitted later than a position of a start or end symbol of an SPS PDSCH with a smallest or largest SPS configuration index among the SPS PDSCHs indicated to be jointly released in a slot in which the SPS PDSCH with the smallest or largest SPS configuration index is transmitted.

In one embodiment, the hybrid automatic repeat request-acknowledgement information of the PDCCH is mapped to a hybrid automatic repeat request-acknowledgement information position corresponding to the predetermined SPS PDSCH in a hybrid automatic repeat request-acknowledgement codebook for transmission.

In one embodiment, the SPS PDSCHs include: an SPS PDSCH that needs feedback of hybrid automatic repeat request-acknowledgment information, and/or an SPS PDSCH determined not to collide with an uplink symbol according to a slot structure configured by high-layer signaling.

Figure 6:
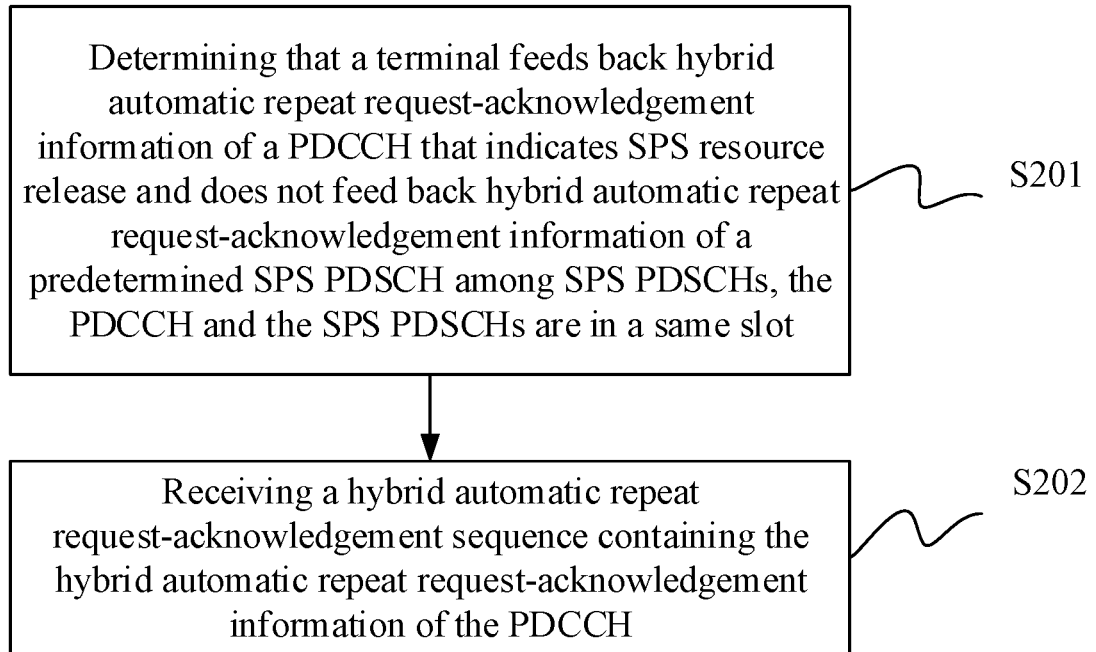
FIG. 6 is a schematic flowchart of an information communication method on the network side according to an embodiment of the present application.

On the network side, referring to FIG. 6, an information communication method according to an embodiment of the present application includes:

S201: determining that a terminal feeds back hybrid automatic repeat request-acknowledgement information to a PDCCH that indicates SPS resource release and does not feed back hybrid automatic repeat request-acknowledgement information of a predetermined SPS PDSCH among SPS PDSCHs when sending the PDCCH to the terminal in a slot in which the SPS PDSCHs need to be sent;

S202: receiving a hybrid automatic repeat request-acknowledgement sequence containing the hybrid automatic repeat request-acknowledgement information of the PDCCH.

In one embodiment, determining that the terminal feeds back hybrid automatic repeat request-acknowledgement information to the PDCCH and does not feed back hybrid automatic repeat request-acknowledgement information of a predetermined SPS PDSCH among the SPS PDSCHs, specifically includes one or a combination of:

Case 1: for a terminal that supports receiving at most A unicast PDSCHs in one slot, if a PDCCH indicating SPS resource release is received in a slot in which B SPS PDSCHs need to be received, then determining to feed back hybrid automatic repeat request-acknowledgement information of the PDCCH and not to feed back hybrid automatic repeat request-acknowledgement information of a predetermined SPS PDSCH among the B SPS PDSCHs, and A is greater than 1, and B is less than or equal to A;

Case 2: for a terminal that supports receiving at most one unicast PDSCH in one slot, if a PDCCH indicating SPS resource release is received in a slot in which an SPS PDSCH needs to be received, then determining to feed back hybrid automatic repeat request-acknowledgement information of the PDCCH and not to feed back hybrid automatic repeat request-acknowledgement information to the SPS PDSCH;

Case 3: in response to a hybrid automatic repeat request-acknowledgement information of the PDCCH and a hybrid automatic repeat request-acknowledgement information of the SPS PDSCHs needing to be transmitted in a same slot or sub-slot, determining that the terminal feeds back hybrid automatic repeat request-acknowledgement information to the PDCCH and does not feed back hybrid automatic repeat request-acknowledgement information of a predetermined SPS PDSCH among the SPS PDSCHs;

Case 4: determining that the terminal feeds back hybrid automatic repeat request-acknowledgement information to the PDCCH and does not feed back hybrid automatic repeat request-acknowledgement information of a predetermined SPS PDSCH among the SPS PDSCHs when one of following conditions is met:

the terminal transmits hybrid automatic repeat request-acknowledgement information to the PDCCH and at least one of SPS PDSCHs indicated by the PDCCH to be released in a same slot or sub-slot;

or, the terminal transmits hybrid automatic repeat request-acknowledgement information to the PDCCH and at least one SPS PDSCH transmitted in a slot in which the PDCCH is transmitted among SPS PDSCHs indicated by the PDCCH to be released in a same slot or sub-slot;

or, the terminal transmits hybrid automatic repeat request-acknowledgement information to the PDCCH and the predetermined SPS PDSCH in a same slot or sub-slot;

Case 5: determining that the terminal feeds back hybrid automatic repeat request-acknowledgement information to the PDCCH and does not feed back hybrid automatic repeat request-acknowledgement information of a predetermined SPS PDSCH among the SPS PDSCHs when the PDCCH and the SPS PDSCHs have a same priority;

Case 6: determining that the terminal feeds back hybrid automatic repeat request-acknowledgement information to the PDCCH and does not feed back hybrid automatic repeat request-acknowledgement information of a predetermined SPS PDSCH among the SPS PDSCHs when the PDCCH and the SPS PDSCHs are transmitted on a same carrier;

Case 7: determining that the terminal feeds back hybrid automatic repeat request-acknowledgement information to the PDCCH and does not feed back hybrid automatic repeat request-acknowledgement information of a predetermined SPS PDSCH among the SPS PDSCHs when the terminal is configured to use a semi-static hybrid automatic repeat request-acknowledgement information transmission mode;

Case 8: when there are C downlink transmission opportunities in the slot, if a PDCCH indicating SPS resource release is received in a slot in which B SPS PDSCHs need to be received, then determining that the terminal feeds back hybrid automatic repeat request-acknowledgement information to the PDCCH and does not feed back hybrid automatic repeat request-acknowledgement information of a predetermined SPS PDSCH among the B SPS PDSCHs, and C is greater than or equal to 1, and B is less than or equal to C.

In one embodiment, the predetermined SPS PDSCH includes:

an SPS PDSCH with a smallest or largest SPS configuration index among the SPS PDSCHs;

or, when the PDCCH only indicates release of one SPS PDSCH, the predetermined SPS PDSCH is an SPS PDSCH indicated by the PDCCH to be released;

or, when the PDCCH indicates joint release of a plurality of SPS PDSCHs, the predetermined SPS PDSCH is an SPS PDSCH with a smallest or largest SPS configuration index among SPS PDSCHs transmitted in the slot among the plurality of SPS PDSCHs indicated by the PDCCH to be jointly released, or an SPS PDSCH with a smallest or largest SPS configuration index among the plurality of SPS PDSCHs indicated by the PDCCH to be jointly released.

In one embodiment, when the PDCCH only indicates release of one SPS PDSCH:

the PDCCH is transmitted in a slot in which the SPS PDSCH indicated to be released is transmitted;

or, the PDCCH is transmitted no later than a position of a start or end symbol of the released SPS PDSCH in a slot in which the SPS PDSCH indicated to be released is transmitted.

In one embodiment, when the PDCCH indicates joint release of a plurality of SPS PDSCHs:

the PDCCH is transmitted in one of slots in which the plurality of SPS PDSCH indicated to be jointly released are transmitted, or in a slot in which an SPS PDSCH with a smallest or largest SPS configuration index among the plurality of SPS PDSCHs is transmitted;

or, the PDCCH is transmitted no later than a position of a start or end symbol of an SPS PDSCH contained in the one slot and indicated by the PDCCH to be released in one of slots in which the plurality of SPS PDSCH indicated to be jointly released are transmitted;

or, the PDCCH is transmitted no later than a position of a start or end symbol of an SPS PDSCH with a smallest or largest SPS configuration index among the plurality of SPS PDSCHs indicated to be jointly released in a slot in which the SPS PDSCH with the smallest or largest SPS configuration index is transmitted.

In one embodiment, when SPS PDSCHs indicated by the PDCCH to be released are contained in the slot, or when at least one of SPS PDSCHs indicated by the PDCCH to be released is contained in the slot, or when an SPS PDSCH with a smallest or largest SPS configuration index among SPS PDSCHs indicated by the PDCCH to be released is contained in the slot, it is determined that the terminal feeds back hybrid automatic repeat request-acknowledgement information to the PDCCH and does not feed back hybrid automatic repeat request-acknowledgement information to the predetermined SPS PDSCH among the SPS PDSCHs.

In one embodiment, if the PDCCH only indicates release of one SPS PDSCH:

the PDCCH is not sent outside a slot where the SPS PDSCH indicated by the PDCCH to be released is located, or the PDCCH is not sent in a slot that does not contain the SPS PDSCH indicated by the PDCCH to be released;

or, the PDCCH is not sent no earlier than a position of a start or end symbol of the SPS PDSCH in a slot where the SPS PDSCH indicated by the PDCCH to be released is located, or the PDCCH is not sent later than a position of a start or end symbol of the SPS PDSCH in a slot where the SPS PDSCH indicated by the PDCCH to be released is located.

In one embodiment, if the PDCCH indicates joint release of a plurality of SPS PDSCHs:

the PDCCH is not sent outside a slot in which an SPS PDSCH with a smallest or largest SPS configuration index among the SPS PDSCHs indicated by the PDCCH to be jointly released is transmitted, or the PDCCH is not sent in a slot that does not contain an SPS PDSCH with a smallest or largest SPS configuration index among the SPS PDSCHs indicated by the PDCCH to be jointly released;

or, the PDCCH is not sent no earlier than a position of a start or end symbol of an SPS PDSCH with a smallest or largest SPS configuration index among the SPS PDSCHs indicated by the PDCCH to be jointly released in a slot in which the SPS PDSCH with the smallest or largest SPS configuration index is transmitted, or the PDCCH is not sent later than a position of a start or end symbol of an SPS PDSCH with a smallest or largest SPS configuration index among the SPS PDSCHs indicated by the PDCCH to be jointly released in a slot in which the SPS PDSCH with the smallest or largest SPS configuration index is transmitted.

In one embodiment, the hybrid automatic repeat request-acknowledgement information of the PDCCH is mapped to a hybrid automatic repeat request-acknowledgement information position corresponding to the predetermined SPS PDSCH in a hybrid automatic repeat request-acknowledgement codebook for transmission.

In one embodiment, the SPS PDSCHs include: an SPS PDSCH that needs feedback of hybrid automatic repeat request-acknowledgment information, and/or an SPS PDSCH determined not to collide with an uplink symbol according to a slot structure configured by high-layer signaling.

Figure 7:
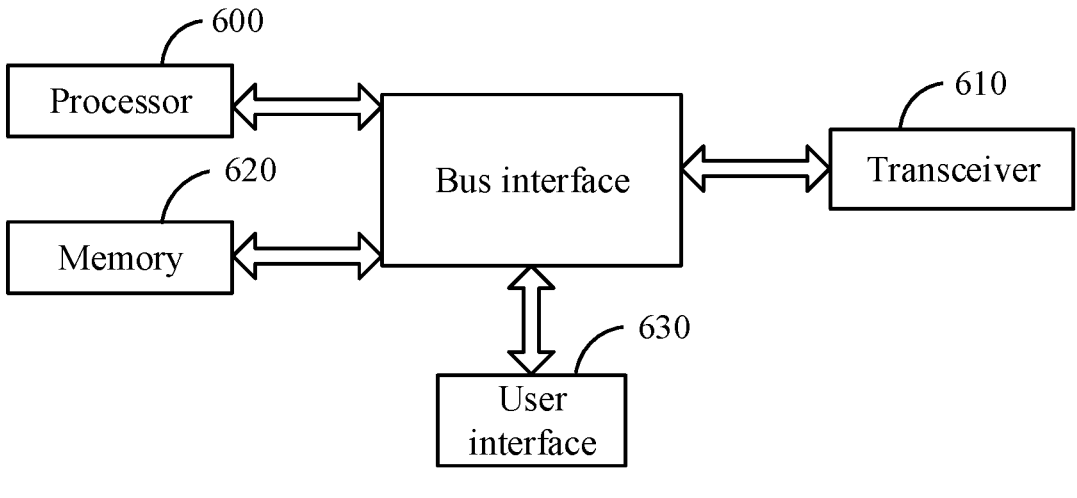
FIG. 7 is a structural schematic diagram of an information communication apparatus on the terminal side according to an embodiment of the present application.

On the terminal side, referring to FIG. 7, an information communication apparatus according to an embodiment of the present application includes:

a memory 620 configured to store program instructions;

a processor 600 configured to invoke the program instructions stored in the memory, and execute according to an obtained program:

determining to feed back hybrid automatic repeat request-acknowledgement information to a PDCCH that indicates SPS resource release and not to feed back hybrid automatic repeat request-acknowledgement information of a predetermined SPS PDSCH among SPS PDSCHs when receiving the PDCCH in a slot in which the SPS PDSCHs need to be received;

transmitting a hybrid automatic repeat request-acknowledgement sequence containing the hybrid automatic repeat request-acknowledgement information of the PDCCH.

In one embodiment, determining to feed back hybrid automatic repeat request-acknowledgement information of the PDCCH and not to feed back hybrid automatic repeat request-acknowledgement information of a predetermined SPS PDSCH among the SPS PDSCHs, specifically includes one or a combination of:

Case 1: for a terminal that supports receiving at most A unicast PDSCHs in one slot, if a PDCCH indicating SPS resource release is received in a slot in which B SPS PDSCHs need to be received, then determining to feed back hybrid automatic repeat request-acknowledgement information of the PDCCH and not to feed back hybrid automatic repeat request-acknowledgement information of a predetermined SPS PDSCH among the B SPS PDSCHs, and A is greater than 1, and B is less than or equal to A;

Case 2: for a terminal that supports receiving at most one unicast PDSCH in one slot, if a PDCCH indicating SPS resource release is received in a slot in which an SPS PDSCH needs to be received, then determining to feed back hybrid automatic repeat request-acknowledgement information of the PDCCH and not to feed back hybrid automatic repeat request-acknowledgement information to the SPS PDSCH;

Case 3: in response to a hybrid automatic repeat request-acknowledgement information of the PDCCH and a hybrid automatic repeat request-acknowledgement information of the SPS PDSCHs needing to be transmitted in a same slot or sub-slot, determining to feed back hybrid automatic repeat request-acknowledgement information of the PDCCH and not to feed back hybrid automatic repeat request-acknowledgement information of a predetermined SPS PDSCH among the SPS PDSCHs;

Case 4: determining to feed back hybrid automatic repeat request-acknowledgement information of the PDCCH and not to feed back hybrid automatic repeat request-acknowledgement information of a predetermined SPS PDSCH among the SPS PDSCHs when one of following conditions is met:

hybrid automatic repeat request-acknowledgement information is transmitted to the PDCCH and at least one of SPS PDSCHs indicated by the PDCCH to be released in a same slot or sub-slot;

or, hybrid automatic repeat request-acknowledgement information is transmitted to the PDCCH and at least one SPS PDSCH transmitted in a slot in which the PDCCH is transmitted among SPS PDSCHs indicated by the PDCCH to be released in a same slot or sub-slot;

or, hybrid automatic repeat request-acknowledgement information is transmitted to the PDCCH and the predetermined SPS PDSCH in a same slot or sub-slot;

Case 5: determining to feed back hybrid automatic repeat request-acknowledgement information of the PDCCH and not to feed back hybrid automatic repeat request-acknowledgement information of a predetermined SPS PDSCH among the SPS PDSCHs when the PDCCH and the SPS PDSCHs have a same priority;

Case 6: determining to feed back hybrid automatic repeat request-acknowledgement information of the PDCCH and not to feed back hybrid automatic repeat request-acknowledgement information of a predetermined SPS PDSCH among the SPS PDSCHs when the PDCCH and the SPS PDSCHs are transmitted on a same carrier;

Case 7: determining to feed back hybrid automatic repeat request-acknowledgement information of the PDCCH and not to feed back hybrid automatic repeat request-acknowledgement information of a predetermined SPS PDSCH among the SPS PDSCHs when the terminal is configured to use a semi-static hybrid automatic repeat request-acknowledgement information transmission mode;

Case 8: when there are C downlink transmission opportunities in the slot, if a PDCCH indicating SPS resource release is received in a slot in which B SPS PDSCHs need to be received, then determining to feed back hybrid automatic repeat request-acknowledgement information of the PDCCH and not to feed back hybrid automatic repeat request-acknowledgement information of a predetermined SPS PDSCH among the B SPS PDSCHs, and C is greater than or equal to 1, and B is less than or equal to C.

In one embodiment, the predetermined SPS PDSCH includes:

an SPS PDSCH with a smallest or largest SPS configuration index among the SPS PDSCHs;

or, when the PDCCH only indicates release of one SPS PDSCH, the predetermined SPS PDSCH is an SPS PDSCH indicated by the PDCCH to be released;

or, when the PDCCH indicates joint release of a plurality of SPS PDSCHs, the predetermined SPS PDSCH is an SPS PDSCH with a smallest or largest SPS configuration index among SPS PDSCHs transmitted in the slot among the plurality of SPS PDSCHs indicated by the PDCCH to be jointly released, or an SPS PDSCH with a smallest or largest SPS configuration index among the plurality of SPS PDSCHs indicated by the PDCCH to be jointly released.

In one embodiment, when the PDCCH only indicates release of one SPS PDSCH:

the PDCCH is transmitted in a slot in which the SPS PDSCH indicated to be released is transmitted;

or, the PDCCH is transmitted no later than a position of a start or end symbol of the released SPS PDSCH in a slot in which the SPS PDSCH indicated to be released is transmitted.

In one embodiment, when the PDCCH indicates joint release of a plurality of SPS PDSCHs:

the PDCCH is transmitted in one of slots in which the plurality of SPS PDSCH indicated to be jointly released are transmitted, or in a slot in which an SPS PDSCH with a smallest or largest SPS configuration index among the plurality of SPS PDSCHs is transmitted;

or, the PDCCH is transmitted no later than a position of a start or end symbol of an SPS PDSCH contained in the one slot and indicated by the PDCCH to be released in one of slots in which the plurality of SPS PDSCH indicated to be jointly released are transmitted;

or, the PDCCH is transmitted no later than a position of a start or end symbol of an SPS PDSCH with a smallest or largest SPS configuration index among the plurality of SPS PDSCHs indicated to be jointly released in a slot in which the SPS PDSCH with the smallest or largest SPS configuration index is transmitted.

In one embodiment, when SPS PDSCHs indicated by PDCCH to be released are contained in the slot, or when at least one of SPS PDSCHs indicated by the PDCCH to be released is contained in the slot, or when an SPS PDSCH with a smallest or largest SPS configuration index among SPS PDSCHs indicated by the PDCCH to be released is contained in the slot, it is determined to feed back hybrid automatic repeat request-acknowledgement information of the PDCCH and not to feed back hybrid automatic repeat request-acknowledgement information to the predetermined SPS PDSCH among the SPS PDSCHs.

In one embodiment, if the PDCCH only indicates release of one SPS PDSCH:

a terminal does not expect the PDCCH not to be transmitted in a slot where the SPS PDSCH indicated to be released is located, or does not expect the PDCCH to be transmitted in a slot that does not contain the SPS PDSCH indicated to be released;

or, the terminal does not expect the PDCCH not to be transmitted earlier than a position of a start or end symbol of the SPS PDSCH in a slot where the SPS PDSCH indicated to be released is located, or does not expect the PDCCH to be transmitted later than a position of a start or end symbol of the SPS PDSCH in a slot where the SPS PDSCH indicated to be released is located.

In one embodiment, if the PDCCH indicates joint release of a plurality of SPS PDSCHs:

a terminal does not expect the PDCCH not to be transmitted in a slot in which an SPS PDSCH with a smallest or largest SPS configuration index among the SPS PDSCHs indicated to be jointly released is transmitted, or the terminal does not expect the PDCCH to be transmitted in a slot that does not contain an SPS PDSCH with a smallest or largest SPS configuration index among the SPS PDSCHs indicated to be jointly released;

or, the terminal does not expect the PDCCH not to be transmitted earlier than a position of a start or end symbol of an SPS PDSCH with a smallest or largest SPS configuration index among the SPS PDSCHs indicated to be jointly released in a slot in which the SPS PDSCH with the smallest or largest SPS configuration index is transmitted, or the terminal does not expect the PDCCH to be transmitted later than a position of a start or end symbol of an SPS PDSCH with a smallest or largest SPS configuration index among the SPS PDSCHs indicated to be jointly released in a slot in which the SPS PDSCH with the smallest or largest SPS configuration index is transmitted.

In one embodiment, the hybrid automatic repeat request-acknowledgement information of the PDCCH is mapped to a hybrid automatic repeat request-acknowledgement information position corresponding to the predetermined SPS PDSCH in a hybrid automatic repeat request-acknowledgement codebook for transmission.

In one embodiment, the SPS PDSCHs specifically include: an SPS PDSCH that needs feedback of hybrid automatic repeat request-acknowledgment information, and/or an SPS PDSCH determined not to collide with an uplink symbol according to a slot structure configured by high-layer signaling.

A transceiver 610 is configured to receive and send the data under the control of the processor 600.

Here, in FIG. 7, the bus architecture may include any numbers of interconnected buses and bridges, and link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the units for communicating with various other devices over the transmission media. For different user equipments, the user interface 630 may also be the interface for inter-connecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

In one embodiment, the processor 600 may be Central Processing Unit (CPU), Application Specific Integrated Circuit (ASIC), Field-Programmable Gate Array (FPGA) or Complex Programmable Logic Device (CPLD).

Figure 8:
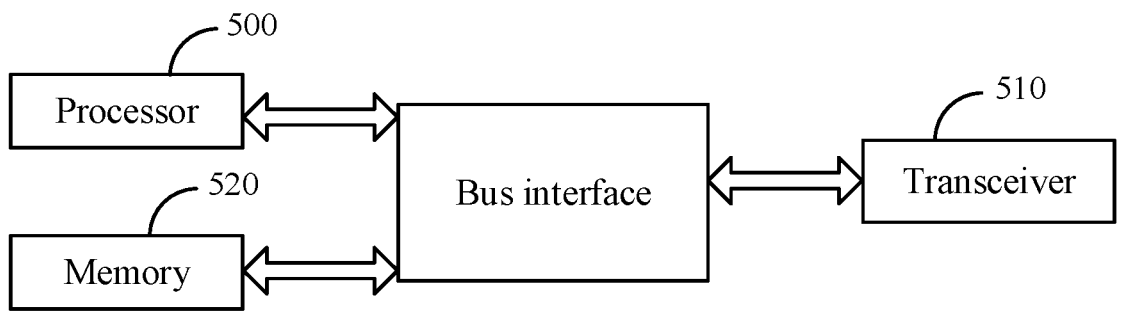
FIG. 8 is a structural schematic diagram of an information communication apparatus on the network side according to an embodiment of the present application.

On the network side, referring to FIG. 8, an information communication apparatus according to an embodiment of the present application includes:

a memory 520 configured to store program instructions;

a processor 500 configured to invoke the program instructions stored in the memory, and execute according to an obtained program:

determining that a terminal feeds back hybrid automatic repeat request-acknowledgement information to a PDCCH that indicates SPS resource release and does not feed back hybrid automatic repeat request-acknowledgement information of a predetermined SPS PDSCH among SPS PDSCHs when sending the PDCCH to the terminal in a slot in which the SPS PDSCHs need to be sent;

receiving a hybrid automatic repeat request-acknowledgement sequence containing the hybrid automatic repeat request-acknowledgement information of the PDCCH.

In one embodiment, determining that the terminal feeds back hybrid automatic repeat request-acknowledgement information to the PDCCH and does not feed back hybrid automatic repeat request-acknowledgement information of a predetermined SPS PDSCH among the SPS PDSCHs, specifically includes one or a combination of:

Case 1: for a terminal that supports receiving at most A unicast PDSCHs in one slot, if a PDCCH indicating SPS resource release is received in a slot in which B SPS PDSCHs need to be received, then determining to feed back hybrid automatic repeat request-acknowledgement information of the PDCCH and not to feed back hybrid automatic repeat request-acknowledgement information of a predetermined SPS PDSCH among the B SPS PDSCHs, and A is greater than 1, and B is less than or equal to A;

Case 2: for a terminal that supports receiving at most one unicast PDSCH in one slot, if a PDCCH indicating SPS resource release is received in a slot in which an SPS PDSCH needs to be received, then determining to feed back hybrid automatic repeat request-acknowledgement information of the PDCCH and not to feed back hybrid automatic repeat request-acknowledgement information to the SPS PDSCH;

Case 3: in response to a hybrid automatic repeat request-acknowledgement information of the PDCCH and a hybrid automatic repeat request-acknowledgement information of the SPS PDSCHs needing to be transmitted in a same slot or sub-slot, determining that the terminal feeds back hybrid automatic repeat request-acknowledgement information to the PDCCH and does not feed back hybrid automatic repeat request-acknowledgement information of a predetermined SPS PDSCH among the SPS PDSCHs;

Case 4: determining that the terminal feeds back hybrid automatic repeat request-acknowledgement information to the PDCCH and does not feed back hybrid automatic repeat request-acknowledgement information of a predetermined SPS PDSCH among the SPS PDSCHs when one of following conditions is met:

the terminal transmits hybrid automatic repeat request-acknowledgement information to the PDCCH and at least one of SPS PDSCHs indicated by the PDCCH to be released in a same slot or sub-slot;

or, the terminal transmits hybrid automatic repeat request-acknowledgement information to the PDCCH and at least one SPS PDSCH transmitted in a slot in which the PDCCH is transmitted among SPS PDSCHs indicated by the PDCCH to be released in a same slot or sub-slot;

or, the terminal transmits hybrid automatic repeat request-acknowledgement information to the PDCCH and the predetermined SPS PDSCH in a same slot or sub-slot;

Case 5: determining that the terminal feeds back hybrid automatic repeat request-acknowledgement information to the PDCCH and does not feed back hybrid automatic repeat request-acknowledgement information of a predetermined SPS PDSCH among the SPS PDSCHs when the PDCCH and the SPS PDSCHs have a same priority;

Case 6: determining that the terminal feeds back hybrid automatic repeat request-acknowledgement information to the PDCCH and does not feed back hybrid automatic repeat request-acknowledgement information of a predetermined SPS PDSCH among the SPS PDSCHs when the PDCCH and the SPS PDSCHs are transmitted on a same carrier;

Case 7: determining that the terminal feeds back hybrid automatic repeat request-acknowledgement information to the PDCCH and does not feed back hybrid automatic repeat request-acknowledgement information of a predetermined SPS PDSCH among the SPS PDSCHs when the terminal is configured to use a semi-static hybrid automatic repeat request-acknowledgement information transmission mode;

Case 8: when there are C downlink transmission opportunities in the slot, if a PDCCH indicating SPS resource release is received in a slot in which B SPS PDSCHs need to be received, then determining that the terminal feeds back hybrid automatic repeat request-acknowledgement information to the PDCCH and does not feed back hybrid automatic repeat request-acknowledgement information of a predetermined SPS PDSCH among the B SPS PDSCHs, and C is greater than or equal to 1, and B is less than or equal to C.

In one embodiment, the predetermined SPS PDSCH includes:

an SPS PDSCH with a smallest or largest SPS configuration index among the SPS PDSCHs;

or, when the PDCCH only indicates release of one SPS PDSCH, the predetermined SPS PDSCH is an SPS PDSCH indicated by the PDCCH to be released;

or, when the PDCCH indicates joint release of a plurality of SPS PDSCHs, the predetermined SPS PDSCH is an SPS PDSCH with a smallest or largest SPS configuration index among SPS PDSCHs transmitted in the slot among the plurality of SPS PDSCHs indicated by the PDCCH to be jointly released, or an SPS PDSCH with a smallest or largest SPS configuration index among the plurality of SPS PDSCHs indicated by the PDCCH to be jointly released.

In one embodiment, when the PDCCH only indicates release of one SPS PDSCH:

the PDCCH is transmitted in a slot in which the SPS PDSCH indicated to be released is transmitted;

or, the PDCCH is transmitted no later than a position of a start or end symbol of the released SPS PDSCH in a slot in which the SPS PDSCH indicated to be released is transmitted.

In one embodiment, when the PDCCH indicates joint release of a plurality of SPS PDSCHs:

the PDCCH is transmitted in one of slots in which the plurality of SPS PDSCH indicated to be jointly released are transmitted, or in a slot in which an SPS PDSCH with a smallest or largest SPS configuration index among the plurality of SPS PDSCHs is transmitted;

or, the PDCCH is transmitted no later than a position of a start or end symbol of an SPS PDSCH contained in the one slot and indicated by the PDCCH to be released in one of slots in which the plurality of SPS PDSCH indicated to be jointly released are transmitted;

or, the PDCCH is transmitted no later than a position of a start or end symbol of an SPS PDSCH with a smallest or largest SPS configuration index among the plurality of SPS PDSCHs indicated to be jointly released in a slot in which the SPS PDSCH with the smallest or largest SPS configuration index is transmitted.

In one embodiment, when SPS PDSCHs indicated by the PDCCH to be released are contained in the slot, or when at least one of SPS PDSCHs indicated by the PDCCH to be released is contained in the slot, or when an SPS PDSCH with a smallest or largest SPS configuration index among SPS PDSCHs indicated by the PDCCH to be released is contained in the slot, it is determined that the terminal feeds back hybrid automatic repeat request-acknowledgement information to the PDCCH and does not feed back hybrid automatic repeat request-acknowledgement information to the predetermined SPS PDSCH among the SPS PDSCHs.

In one embodiment, if the PDCCH only indicates release of one SPS PDSCH:

the PDCCH is sent in a slot where the SPS PDSCH indicated by the PDCCH to be released is located, or the PDCCH is sent in a slot containing the SPS PDSCH indicated by the PDCCH to be released;

or, the PDCCH is sent earlier than a position of a start or end symbol of the SPS PDSCH in a slot where the SPS PDSCH indicated by the PDCCH to be released is located, or the PDCCH is sent later than a position of a start or end symbol of the SPS PDSCH in a slot where the SPS PDSCH indicated by the PDCCH to be released is located.

That is, if the PDCCH only indicates release of one SPS PDSCH:

the PDCCH is not sent outside a slot where the SPS PDSCH indicated by the PDCCH to be released is located, or the PDCCH is not sent in a slot that does not contain the SPS PDSCH indicated by the PDCCH to be released;

or, the PDCCH is not sent no earlier than a position of a start or end symbol of the SPS PDSCH in a slot where the SPS PDSCH indicated by the PDCCH to be released is located, or the PDCCH is not sent later than a position of a start or end symbol of the SPS PDSCH in a slot where the SPS PDSCH indicated by the PDCCH to be released is located.

In one embodiment, if the PDCCH indicates joint release of a plurality of SPS PDSCHs:

the PDCCH is sent in a slot in which an SPS PDSCH with a smallest or largest SPS configuration index among the SPS PDSCHs indicated by the PDCCH to be jointly released is transmitted, or the PDCCH is sent in a slot containing an SPS PDSCH with a smallest or largest SPS configuration index among the SPS PDSCHs indicated by the PDCCH to be jointly released;

or, the PDCCH is sent earlier than a position of a start or end symbol of an SPS PDSCH with a smallest or largest SPS configuration index among the SPS PDSCHs indicated by the PDCCH to be jointly released in a slot in which the SPS PDSCH with the smallest or largest SPS configuration index is transmitted, or the PDCCH is sent later than a position of a start or end symbol of an SPS PDSCH with a smallest or largest SPS configuration index among the SPS PDSCHs indicated by the PDCCH to be jointly released in a slot in which the SPS PDSCH with the smallest or largest SPS configuration index is transmitted.

That is, if the PDCCH indicates joint release of a plurality of SPS PDSCHs:

the PDCCH is not sent outside a slot in which an SPS PDSCH with a smallest or largest SPS configuration index among the SPS PDSCHs indicated by the PDCCH to be jointly released is transmitted, or the PDCCH is not sent in a slot that does not contain an SPS PDSCH with a smallest or largest SPS configuration index among the SPS PDSCHs indicated by the PDCCH to be jointly released;

or, the PDCCH is not sent no earlier than a position of a start or end symbol of an SPS PDSCH with a smallest or largest SPS configuration index among the SPS PDSCHs indicated by the PDCCH to be jointly released in a slot in which the SPS PDSCH with the smallest or largest SPS configuration index is transmitted, or the PDCCH is not sent later than a position of a start or end symbol of an SPS PDSCH with a smallest or largest SPS configuration index among the SPS PDSCHs indicated by the PDCCH to be jointly released in a slot in which the SPS PDSCH with the smallest or largest SPS configuration index is transmitted.

In one embodiment, the hybrid automatic repeat request-acknowledgement information of the PDCCH is mapped to a hybrid automatic repeat request-acknowledgement information position corresponding to the predetermined SPS PDSCH in a hybrid automatic repeat request-acknowledgement codebook for transmission.

In one embodiment, the SPS PDSCHs specifically include: an SPS PDSCH that needs feedback of hybrid automatic repeat request-acknowledgment information, and/or an SPS PDSCH determined not to collide with an uplink symbol according to a slot structure configured by high-layer signaling.

A transceiver 510 is configured to receive and send the data under the control of the processor 500.

Here, in FIG. 8, the bus architecture may include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the units for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

Figure 9:
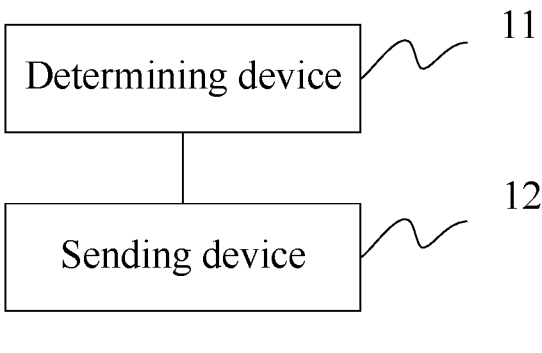
FIG. 9 is a structural schematic diagram of another information communication apparatus on the terminal side according to an embodiment of the present application.

On the terminal side, referring to FIG. 9, another information communication apparatus according to an embodiment of the present application includes:

a determining device 11, configured to determine to feed back hybrid automatic repeat request-acknowledgement information to a PDCCH that indicates SPS resource release and not to feed back hybrid automatic repeat request-acknowledgement information of a predetermined SPS PDSCH among SPS PDSCHs when receiving the PDCCH in a slot in which the SPS PDSCHs need to be received;

a sending device 12, configured to transmit a hybrid automatic repeat request-acknowledgement sequence containing the hybrid automatic repeat request-acknowledgement information of the PDCCH.

Figure 10:
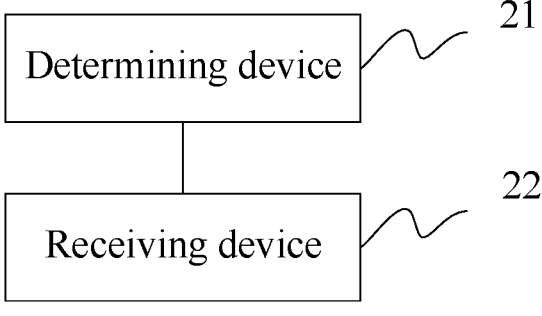
FIG. 10 is a structural schematic diagram of another information communication apparatus on the network side according to an embodiment of the present application.

On the network side, referring to FIG. 10, another information communication apparatus according to an embodiment of the present application includes:

a determining device 21, configured to determine that a terminal feeds back hybrid automatic repeat request-acknowledgement information to a PDCCH that indicates SPS resource release and does not feed back hybrid automatic repeat request-acknowledgement information of a predetermined SPS PDSCH among SPS PDSCHs when sending the PDCCH to the terminal in a slot in which the SPS PDSCHs need to be sent;

a receiving device 22, configured to receive a hybrid automatic repeat request-acknowledgement sequence containing the hybrid automatic repeat request-acknowledgement information of the PDCCH.

It should be noted that the division of units in the embodiments of the present application is illustrative, and is merely a kind of logical function division, and there may be other division methods in actual implementations. In addition, the functional units in each embodiment of the present application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a computer readable storage medium. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, which can specifically be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like. which is not limited in the embodiments of the present application.

The processing flows of the above methods may be implemented by a software program, which may be stored in a storage medium. When the stored software program is invoked, the above method steps are performed.

The embodiments of the present application can provide methods, systems and computer program products. Thus, the present application can take the form of hardware embodiments alone, software embodiments alone, or embodiments combining the software and hardware aspects. Also, the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which may guide the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus, the instructions executed on the computer or another programmable device provide steps for implementing the functions specified in one or more processes of the flow charts and/or one or more blocks of the block diagrams.

What is claimed is:

1. An information communication method, comprises:
  determining to feed back a hybrid automatic repeat request-acknowledgement information of a Physical Downlink Control Channel, PDCCH that indicates Semi-Persistent Scheduling, SPS, resource release, and not to feed back a hybrid automatic repeat request-acknowledgement information of a predetermined SPS Physical Downlink Shared Channel, PDSCH, among SPS PDSCHs, wherein the SPS PDSCHs and the PDCCH are in a same slot;
  transmitting a hybrid automatic repeat request-acknowledgement sequence containing the hybrid automatic repeat request-acknowledgement information of the PDCCH.

2. The method according to claim 1, wherein the determining to feed back a hybrid automatic repeat request-acknowledgement information of the PDCCH and not to feed back a hybrid automatic repeat request-acknowledgement information of a predetermined SPS PDSCH among the SPS PDSCHs, comprises at least one of followings:
  Case 1: for a terminal that supports receiving at most A unicast PDSCHs in one slot, in response to a PDCCH indicating SPS resource release being received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, wherein A is greater than 1, and B is less than or equal to A;
  Case 2: for a terminal that supports receiving at most one unicast PDSCH in one slot, in response to a PDCCH indicating SPS resource release being received in a slot in which an SPS PDSCH needs to be received, determining to feed back a hybrid automatic repeat request-acknowledgement information of the PDCCH and not to feed back a hybrid automatic repeat request-acknowledgement information of the SPS PDSCHs;
  Case 3: in response to a hybrid automatic repeat request-acknowledgement information of the PDCCH and a hybrid automatic repeat request-acknowledgement information of the SPS PDSCHs needing to be transmitted in a same slot or sub-slot, determining to feed back a hybrid automatic repeat request-acknowledgement information of the PDCCH and not to feed back a hybrid automatic repeat request-acknowledgement information of a predetermined SPS PDSCH among the SPS PDSCHs;
  Case 4: determining to feed back a hybrid automatic repeat request-acknowledgement information of the PDCCH and not to feed back a hybrid automatic repeat request-acknowledgement information of a predetermined SPS PDSCH among the SPS PDSCHs, in response to one of following conditions being met:
  a hybrid automatic repeat request-acknowledgement information of the PDCCH and a hybrid automatic repeat request-acknowledgement information of at least one SPS PDSCH are to be transmitted in a same slot or sub-slot, wherein the at least one SPS PDSCH is one SPS PDSCH of SPS PDSCHs indicated to be released by the PDCCH;
  or, a hybrid automatic repeat request-acknowledgement information of the PDCCH and a hybrid automatic repeat request-acknowledgement information of at least one SPS PDSCH are to be transmitted in a same slot or sub-slot, wherein the at least one SPS PDSCH is transmitted in a slot in which the PDCCH is transmitted and is one SPS PDSCH of SPS PDSCHs indicated to be released by the PDCCH;
  or, a hybrid automatic repeat request-acknowledgement information of the PDCCH and a hybrid automatic repeat request-acknowledgement information of the predetermined SPS PDSCH are to be transmitted in a same slot or sub-slot;
  Case 5: determining to feed back a hybrid automatic repeat request-acknowledgement information of the PDCCH and not to feed back a hybrid automatic repeat request-acknowledgement information of a predetermined SPS PDSCH among the SPS PDSCHs, in response to the PDCCH and the SPS PDSCHs having a same priority;
  Case 6: determining to feed back a hybrid automatic repeat request-acknowledgement information of the PDCCH and not to feed back a hybrid automatic repeat request-acknowledgement information of a predetermined SPS PDSCH among the SPS PDSCHs, in response to the PDCCH and the SPS PDSCHs being transmitted on a same carrier;
  Case 7: determining to feed back a hybrid automatic repeat request-acknowledgement information of the PDCCH and not to feed back a hybrid automatic repeat request-acknowledgement information of a predetermined SPS PDSCH among the SPS PDSCHs, in response to the terminal being configured with a semi-static hybrid automatic repeat request-acknowledgement information transmission mode;

Case 8: in response to there are C downlink transmission opportunities in the slot, and a PDCCH indicating SPS resource release is received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, wherein C is greater than or equal to 1, and B is less than or equal to C;

Case 9: in response to SPS PDSCHs indicated to be released by the PDCCH being contained in the slot, or in response to at least one of SPS PDSCHs indicated to be released by the PDCCH being contained in the slot, or in response to an SPS PDSCH with a smallest SPS configuration index or a largest SPS configuration index among SPS PDSCHs indicated to be released by the PDCCH being contained in the slot, determining to feed back a hybrid automatic repeat request-acknowledgement information of the PDCCH and not to feed back a hybrid automatic repeat request-acknowledgement information of the predetermined SPS PDSCH among the SPS PDSCHs.

3. The method according to claim 1, wherein the predetermined SPS PDSCH comprises:

an SPS PDSCH with a smallest SPS configuration index or largest SPS configuration index among the SPS PDSCHs;

or, in response to the PDCCH only indicating a release of one SPS PDSCH, the predetermined SPS PDSCH is the one SPS PDSCH indicated to be released by the PDCCH;

or, in response to the PDCCH indicating a joint release of a plurality of SPS PDSCHs, the predetermined SPS PDSCH is an SPS PDSCH transmitted in the slot with a smallest SPS configuration index or largest SPS configuration index among the plurality of SPS PDSCHs indicated to be jointly released by the PDCCH, or an SPS PDSCH with a smallest SPS configuration index or largest SPS configuration index among the plurality of SPS PDSCHs indicated to be jointly released by the PDCCH.

4. The method according to claim 1, wherein in response to the PDCCH only indicating a release of one SPS PDSCH, the method further comprising at least one of:

the PDCCH is transmitted in a slot in which the one SPS PDSCH indicated to be released is transmitted;

or, the PDCCH is transmitted in a slot in which the one SPS PDSCH indicated to be released is transmitted, and no later than a position of a start or end symbol of the one SPS PDSCH indicated to be released;

and/or, wherein in response to the PDCCH indicating a joint release of a plurality of SPS PDSCHs, the method further comprising at least one of:

the PDCCH is transmitted in one of slots in which the plurality of SPS PDSCHs indicated to be jointly released are transmitted, or in a slot in which an SPS PDSCH with a smallest SPS configuration index or a largest SPS configuration index among the plurality of SPS PDSCHs is transmitted;

or, the PDCCH is transmitted in one of slots in which the plurality of SPS PDSCHs indicated to be jointly released are transmitted, and no later than a position of a start or end symbol of an SPS PDSCH contained in the one slot and indicated by the PDCCH to be released;

or, the PDCCH is transmitted no later than a position of a start or end symbol of an SPS PDSCH with a smallest SPS configuration index or a largest SPS configuration index among the plurality of SPS PDSCHs indicated to be jointly released in a slot in which the SPS PDSCH with the smallest SPS configuration index or a largest SPS configuration index is transmitted.

5. The method according to claim 1, further comprising any one of followings:

Case 1: in response to the PDCCH only indicating release of one SPS PDSCH:

a terminal does not expect the PDCCH not to be transmitted in a slot where the SPS PDSCH indicated to be released by the PDCCH is located, or does not expect the PDCCH to be transmitted in a slot that does not contain the SPS PDSCH indicated to be released by the PDCCH;

or, the terminal does not expect the PDCCH not to be transmitted earlier than a position of a start or end symbol of the SPS PDSCH in a slot where the SPS PDSCH indicated to be released by the PDCCH is located, or does not expect the PDCCH to be transmitted later than a position of a start or end symbol of the SPS PDSCH in a slot where the SPS PDSCH indicated to be released by the PDCCH is located;

Case 2: in response to the PDCCH indicating joint release of a plurality of SPS PDSCHs:

a terminal does not expect the PDCCH not to be transmitted in a slot in which an SPS PDSCH with a smallest SPS configuration index or a largest SPS configuration index among the SPS PDSCHs indicated to be jointly released by the PDCCH is transmitted, or the terminal does not expect the PDCCH to be transmitted in a slot that does not contain an SPS PDSCH with a smallest configuration index or a largest SPS configuration index among the SPS PDSCHs indicated to be jointly released by the PDCCH;

or, the terminal does not expect the PDCCH not to be transmitted earlier than a position of a start or end symbol of an SPS PDSCH with a smallest or largest SPS configuration index among the SPS PDSCHs indicated to be jointly released by the PDCCH in a slot in which the SPS PDSCH with the smallest or largest SPS configuration index is transmitted, or the terminal does not expect the PDCCH to be transmitted later than a position of a start or end symbol of an SPS PDSCH with a smallest or largest SPS configuration index among the SPS PDSCHs indicated to be jointly released by the PDCCH in a slot in which the SPS PDSCH with the smallest or largest SPS configuration index is transmitted;

Case 3: the hybrid automatic repeat request-acknowledgement information of the PDCCH is mapped to a hybrid automatic repeat request-acknowledgement information position corresponding to the predetermined SPS PDSCH in a hybrid automatic repeat request-acknowledgement codebook for transmission;

Case 4: the SPS PDSCHs comprise: an SPS PDSCH that needs feedback of hybrid automatic repeat request-acknowledgment information, and/or an SPS PDSCH determined not to collide with an uplink symbol according to a slot structure configured by high-layer signaling.

6. An information communication apparatus, comprises:
a memory configured to store program instructions;
a processor configured to invoke the program instructions stored in the memory and perform followings according to an obtained program:
determining to feed back a hybrid automatic repeat request-acknowledgement information of a Physical Downlink Control Channel, PDCCH that indicates Semi-Persistent Scheduling, SPS, resource release and not to feed back a hybrid automatic repeat request-acknowledgement information of a predetermined SPS Physical Downlink Shared Channel, PDSCH, among SPS PDSCHs, wherein the SPS PDSCHs and the PDCCH are in the same slot;
transmitting a hybrid automatic repeat request-acknowledgement sequence containing the hybrid automatic repeat request-acknowledgement information of the PDCCH.

7. The apparatus according to claim 6, wherein the determining to feed back a hybrid automatic repeat request-acknowledgement information of the PDCCH and not to feed back a hybrid automatic repeat request-acknowledgement information of a predetermined SPS PDSCH among the SPS PDSCHs, comprises at least one of followings:

Case 1: for a terminal that supports receiving at most A unicast PDSCHs in one slot, in response to a PDCCH indicating SPS resource release being received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, wherein A is greater than 1, and B is less than or equal to A;

Case 2: for a terminal that supports receiving at most one unicast PDSCH in one slot, in response to a PDCCH indicating SPS resource release being received in a slot in which an SPS PDSCH needs to be received, determining to feed back a hybrid automatic repeat request-acknowledgement information of the PDCCH and not to feed back a hybrid automatic repeat request-acknowledgement information to the SPS PDSCH;

Case 3: in response to a hybrid automatic repeat request-acknowledgement information of the PDCCH and a hybrid automatic repeat request-acknowledgement information of the SPS PDSCHs needing to be transmitted in a same slot or sub-slot, determining to feed back a hybrid automatic repeat request-acknowledgement information of the PDCCH and not to feed back a hybrid automatic repeat request-acknowledgement information of a predetermined SPS PDSCH among the SPS PDSCHs;

Case 4: determining to feed back a hybrid automatic repeat request-acknowledgement information of the PDCCH and not to feed back a hybrid automatic repeat request-acknowledgement information of a predetermined SPS PDSCH among the SPS PDSCHs in response to one of following conditions being met:
a hybrid automatic repeat request-acknowledgement information of the PDCCH and a hybrid automatic repeat request-acknowledgement information of at least one SPS PDSCH are to be transmitted in a same slot or sub-slot, wherein the at least one SPS PDSCH is one SPS PDSCH of SPS PDSCHs indicated to be released by the PDCCH;

repeat request-acknowledgement information of at least one SPS PDSCH are to be transmitted in a same slot or sub-slot, wherein the at least one SPS PDSCH is transmitted in a slot in which the PDCCH is transmitted and is one SPS PDSCH of SPS PDSCHs indicated to be released by the PDCCH;
or, a hybrid automatic repeat request-acknowledgement information of the PDCCH and a hybrid automatic repeat request-acknowledgement information of the predetermined SPS PDSCH are to be transmitted in a same slot or sub-slot;

Case 5: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs having a same priority;

Case 6: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs being transmitted on a same carrier;

Case 7: determining to feed back a hybrid automatic repeat request-acknowledgement information of the PDCCH and not to feed back a hybrid automatic repeat request-acknowledgement information of a predetermined SPS PDSCH among the SPS PDSCHs in response to the terminal being configured with a semi-static hybrid automatic repeat request-acknowledgement information transmission mode;

Case 8: in response to there are C downlink transmission opportunities in the slot, and a PDCCH indicating SPS resource release is received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, wherein C is greater than or equal to 1, and B is less than or equal to C;

Case 9: in response to SPS PDSCHs indicated to be released by the PDCCH being contained in the slot, or in response to at least one of SPS PDSCHs indicated to be released by the PDCCH being contained in the slot, or in response to an SPS PDSCH with a smallest SPS configuration index or a largest SPS configuration index among SPS PDSCHs indicated to be released by the PDCCH being contained in the slot, determining to feed back a hybrid automatic repeat request-acknowledgement information of the PDCCH and not to feed back a hybrid automatic repeat request-acknowledgement information of the predetermined SPS PDSCH among the SPS PDSCHs.

8. The apparatus according to claim 6, wherein the predetermined SPS PDSCH comprises:
an SPS PDSCH with a smallest SPS configuration index or largest SPS configuration index among the SPS PDSCHs;
or, in response to the PDCCH only indicating a release of one SPS PDSCH, the predetermined SPS PDSCH is the one SPS PDSCH indicated to be released by the PDCCH;
or, in response to the PDCCH indicating a joint release of a plurality of SPS PDSCHs, the predetermined SPS PDSCH is an SPS PDSCH transmitted in the slot with a smallest SPS configuration index or largest SPS configuration index among the plurality of SPS PDSCHs indicated to be jointly released by the PDCCH, or an SPS PDSCH with a smallest SPS configuration index or largest SPS configuration index among the plurality of SPS PDSCHs indicated to be jointly released by the PDCCH.

9. The apparatus according to claim 6, wherein the processor is further configured to invoke the program instructions stored in the memory and perform any one of followings:

Case 1: in response to the PDCCH only indicating a release of one SPS PDSCH:

the PDCCH is transmitted in a slot in which the one SPS PDSCH indicated to be released is transmitted;

or, the PDCCH is transmitted in a slot in which the one SPS PDSCH indicated to be released is transmitted, and no later than a position of a start or end symbol of the one SPS PDSCH indicated to be released;

Case 2: in response to the PDCCH indicating a joint release of a plurality of SPS PDSCHs:

the PDCCH is transmitted in one of slots in which the plurality of SPS PDSCH indicated to be jointly released are transmitted, or in a slot in which an SPS PDSCH with a smallest SPS configuration index or a largest SPS configuration index among the plurality of SPS PDSCHs is transmitted;

or, the PDCCH is transmitted in one of slots in which the plurality of SPS PDSCHs indicated to be jointly released are transmitted, and no later than a position of a start or end symbol of an SPS PDSCH contained in the one slot and indicated by the PDCCH to be released;

or, the PDCCH is transmitted no later than a position of a start or end symbol of an SPS PDSCH with a smallest SPS configuration index or a largest SPS configuration index among the plurality of SPS PDSCHs indicated to be jointly released in a slot in which the SPS PDSCH with the smallest SPS configuration index or a largest SPS configuration index is transmitted.

10. The apparatus according to claim 6, wherein the processor is further configured to invoke the program instructions stored in the memory and perform any one of followings:

Case 1: in response to the PDCCH only indicating release of one SPS PDSCH:

a terminal does not expect the PDCCH not to be transmitted in a slot where the SPS PDSCH indicated to be released by the PDCCH is located, or does not expect the PDCCH to be transmitted in a slot that does not contain the SPS PDSCH indicated to be released by the PDCCH;

or, the terminal does not expect the PDCCH not to be transmitted earlier than a position of a start or end symbol of the SPS PDSCH in a slot where the SPS PDSCH indicated to be released by the PDCCH is located, or does not expect the PDCCH to be transmitted later than a position of a start or end symbol of the SPS PDSCH in a slot where the SPS PDSCH indicated to be released by the PDCCH is located;

Case 2: in response to the PDCCH indicating joint release of a plurality of SPS PDSCHs:

a terminal does not expect the PDCCH not to be transmitted in a slot in which an SPS PDSCH with a smallest SPS configuration index or a largest SPS configuration index among the SPS PDSCHs indicated to be jointly released by the PDCCH is transmitted, or the terminal does not expect the PDCCH to be transmitted in a slot that does not contain an SPS PDSCH with a smallest configuration index or a largest SPS configuration index among the SPS PDSCHs indicated to be jointly released by the PDCCH;

or, the terminal does not expect the PDCCH not to be transmitted earlier than a position of a start or end symbol of an SPS PDSCH with a smallest or largest SPS configuration index among the SPS PDSCHs indicated to be jointly released by the PDCCH in a slot in which the SPS PDSCH with the smallest or largest SPS configuration index is transmitted, or the terminal does not expect the PDCCH to be transmitted later than a position of a start or end symbol of an SPS PDSCH with a smallest or largest SPS configuration index among the SPS PDSCHs indicated to be jointly released by the PDCCH in a slot in which the SPS PDSCH with the smallest or largest SPS configuration index is transmitted;

Case 3:

the hybrid automatic repeat request-acknowledgement information of the PDCCH is mapped to a hybrid automatic repeat request-acknowledgement information position corresponding to the predetermined SPS PDSCH in a hybrid automatic repeat request-acknowledgement codebook for transmission;

Case 4:

the SPS PDSCHs comprise: an SPS PDSCH that needs feedback of hybrid automatic repeat request-acknowledgment information, and/or an SPS PDSCH determined not to collide with an uplink symbol according to a slot structure configured by high-layer signaling.

11. An information communication method, comprises:

determining that a terminal feeds back a hybrid automatic repeat request-acknowledgement information of a Physical Downlink Control Channel, PDCCH that indicates Semi-Persistent Scheduling, SPS, resource release and does not feed back a hybrid automatic repeat request-acknowledgement information of a predetermined SPS Physical Downlink Shared Channel, PDSCH, among SPS PDSCHs, wherein the SPS PDSCHs and the PDCCH are in the same slot;

receiving a hybrid automatic repeat request-acknowledgement sequence containing the hybrid automatic repeat request-acknowledgement information of the PDCCH.

12. The method according to claim 11, wherein determining that the terminal feeds back a hybrid automatic repeat request-acknowledgement information to the PDCCH and does not feed back a hybrid automatic repeat request-acknowledgement information of a predetermined SPS PDSCH among the SPS PDSCHs, comprises at least one of followings:

Case 1: for a terminal that supports receiving at most A unicast PDSCHs in one slot, in response to a PDCCH indicating SPS resource release being received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, wherein A is greater than 1, and B is less than or equal to A;

Case 2: for a terminal that supports receiving at most one unicast PDSCH in one slot, in response to a PDCCH indicating SPS resource release being received in a slot in which an SPS PDSCH needs to be received, determining to feed back a hybrid automatic repeat request-acknowledgement information of the PDCCH and not to feed back a hybrid automatic repeat request-acknowledgement information to the SPS PDSCH;

Case 3: in response to a hybrid automatic repeat request-acknowledgement information of the PDCCH and a hybrid automatic repeat request-acknowledgement information of the SPS PDSCHs needing to be transmitted in a same slot or sub-slot, determining to feed back a hybrid automatic repeat request-acknowledgement information of the PDCCH and not to feed back a hybrid automatic repeat request-acknowledgement information of a predetermined SPS PDSCH among the SPS PDSCHs;

Case 4: determining to feed back a hybrid automatic repeat request-acknowledgement information of the PDCCH and not to feed back a hybrid automatic repeat request-acknowledgement information of a predetermined SPS PDSCH among the SPS PDSCHs in response to one of following conditions being met:

a hybrid automatic repeat request-acknowledgement information of the PDCCH and a hybrid automatic repeat request-acknowledgement information of at least one SPS PDSCH are to be transmitted in a same slot or sub-slot, wherein the at least one SPS PDSCH is one SPS PDSCH of SPS PDSCHs indicated to be released by the PDCCH;

or, a hybrid automatic repeat request-acknowledgement information of the PDCCH and a hybrid automatic repeat request-acknowledgement information of at least one SPS PDSCH are to be transmitted in a same slot or sub-slot, wherein the at least one SPS PDSCH is transmitted in a slot in which the PDCCH is transmitted and is one SPS PDSCH of SPS PDSCHs indicated to be released by the PDCCH;

or, a hybrid automatic repeat request-acknowledgement information of the PDCCH and a hybrid automatic repeat request-acknowledgement information of the predetermined SPS PDSCH are to be transmitted in a same slot or sub-slot;

Case 5: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs having a same priority;

Case 6: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs being transmitted on a same carrier;

Case 7: determining to feed back a hybrid automatic repeat request-acknowledgement information of the PDCCH and not to feed back a hybrid automatic repeat request-acknowledgement information of a predetermined SPS PDSCH among the SPS PDSCHs in response to the terminal being configured with a semi-static hybrid automatic repeat request-acknowledgement information transmission mode;

Case 8: in response to there are C downlink transmission opportunities in the slot, and a PDCCH indicating SPS resource release is received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, wherein C is greater than or equal to 1, and B is less than or equal to C;

Case 9: in response to SPS PDSCHs indicated to be released by the PDCCH being contained in the slot, or in response to at least one of SPS PDSCHs indicated to be released by the PDCCH being contained in the slot, or in response to an SPS PDSCH with a smallest SPS configuration index or a largest SPS configuration index among SPS PDSCHs indicated to be released by the PDCCH being contained in the slot, determining that the terminal feeds back a hybrid automatic repeat request-acknowledgement information of the PDCCH and not to feed back a hybrid automatic repeat request-acknowledgement information of the predetermined SPS PDSCH among the SPS PDSCHs.

13. The method according to claim 11, wherein the predetermined SPS PDSCH comprises:

an SPS PDSCH with a smallest SPS configuration index or largest SPS configuration index among the SPS PDSCHs;

or, in response to the PDCCH only indicating a release of one SPS PDSCH, the predetermined SPS PDSCH is the one SPS PDSCH indicated to be released by the PDCCH;

or, in response to the PDCCH indicating a joint release of a plurality of SPS PDSCHs, the predetermined SPS PDSCH is an SPS PDSCH transmitted in the slot with a smallest SPS configuration index or largest SPS configuration index among the plurality of SPS PDSCHs indicated to be jointly released by the PDCCH, or an SPS PDSCH with a smallest SPS configuration index or largest SPS configuration index among the plurality of SPS PDSCHs indicated to be jointly released by the PDCCH.

14. The method according to claim 11, wherein in response to the PDCCH only indicating a release of one SPS PDSCH, the method further comprising at least one of:

the PDCCH is transmitted in a slot in which the one SPS PDSCH indicated to be released is transmitted;

or, the PDCCH is transmitted in a slot in which the one SPS PDSCH indicated to be released is transmitted, and no later than a position of a start or end symbol of the one SPS PDSCH indicated to be released;

and/or, wherein in response to the PDCCH indicating a joint release of a plurality of SPS PDSCHs, the method further comprising at least one of:

the PDCCH is transmitted in one of slots in which the plurality of SPS PDSCH indicated to be jointly released are transmitted, or in a slot in which an SPS PDSCH with a smallest SPS configuration index or a largest SPS configuration index among the plurality of SPS PDSCHs is transmitted;

or, the PDCCH is transmitted in one of slots in which the plurality of SPS PDSCHs indicated to be jointly released are transmitted, and no later than a position of a start or end symbol of an SPS PDSCH contained in the one slot and indicated by the PDCCH to be released;

or, the PDCCH is transmitted no later than a position of a start or end symbol of an SPS PDSCH with a smallest SPS configuration index or a largest SPS configuration index among the plurality of SPS PDSCHs indicated to be jointly released in a slot in which the SPS PDSCH with the smallest SPS configuration index or a largest SPS configuration index is transmitted.

15. The method according to claim 11, further comprising any one of followings:

Case 1: in response to the PDCCH only indicating release of one SPS PDSCH:

the PDCCH is sent in a slot where the SPS PDSCH indicated by the PDCCH to be released by the PDCCH is located, or the PDCCH is sent in a slot containing the SPS PDSCH indicated to be released by the PDCCH; or, the PDCCH is sent earlier than a position of a start or end symbol of the SPS PDSCH in a slot where the SPS PDSCH indicated to be released by the PDCCH is located, or the PDCCH is sent later than a position of a start or end symbol of the SPS PDSCH in a slot where the SPS PDSCH indicated to be released by the PDCCH is located;

Case 2: in response to the PDCCH indicating joint release of a plurality of SPS PDSCHs:

the PDCCH is sent in a slot in which an SPS PDSCH with a smallest SPS configuration index or a largest SPS configuration index among the SPS PDSCHs indicated to be jointly released by the PDCCH is transmitted, or the PDCCH is sent in a slot containing an SPS PDSCH with a smallest SPS configuration index or a largest SPS configuration index among the SPS PDSCHs indicated to be jointly released by the PDCCH; or, the PDCCH is sent earlier than a position of a start or end symbol of an SPS PDSCH with a smallest SPS configuration index or a largest SPS configuration index among the SPS PDSCHs indicated to be jointly released by the PDCCH in a slot in which the SPS PDSCH with the smallest SPS configuration index or the largest SPS configuration index is transmitted, or the PDCCH is sent later than a position of a start or end symbol of an SPS PDSCH with a smallest SPS configuration index or a largest SPS configuration index among the SPS PDSCHs indicated to be jointly released by the PDCCH in a slot in which the SPS PDSCH with the smallest SPS configuration index or a largest SPS configuration index is transmitted;

Case 3: the hybrid automatic repeat request-acknowledgement information of the PDCCH is mapped to a hybrid automatic repeat request-acknowledgement information position corresponding to the predetermined SPS PDSCH in a hybrid automatic repeat request-acknowledgement codebook for transmission;

Case 4: the SPS PDSCHs comprise: an SPS PDSCH that needs feedback of hybrid automatic repeat request-acknowledgment information, and/or an SPS PDSCH determined not to collide with an uplink symbol according to a slot structure configured by high-layer signaling.

16. An information communication apparatus, comprises:

a memory configured to store program instructions;

a processor configured to invoke the program instructions stored in the memory and perform the method according to claim 11.

17. The apparatus according to claim 16, wherein the determining that the terminal feeds back a hybrid automatic repeat request-acknowledgement information to the PDCCH and does not feed back a hybrid automatic repeat request-acknowledgement information of a predetermined SPS PDSCH among the SPS PDSCHs, comprises at least one of followings:

Case 1: for a terminal that supports receiving at most A unicast PDSCHs in one slot, in response to a PDCCH indicating SPS resource release being received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, wherein A is greater than 1, and B is less than or equal to A;

Case 2: for a terminal that supports receiving at most one unicast PDSCH in one slot, in response to a PDCCH indicating SPS resource release being received in a slot in which an SPS PDSCH needs to be received, determining to feed back a hybrid automatic repeat request-acknowledgement information of the PDCCH and not to feed back a hybrid automatic repeat request-acknowledgement information to the SPS PDSCH;

Case 3: in response to a hybrid automatic repeat request-acknowledgement information of the PDCCH and a hybrid automatic repeat request-acknowledgement information of the SPS PDSCHs needing to be transmitted in a same slot or sub-slot, determining to feed back a hybrid automatic repeat request-acknowledgement information of the PDCCH and not to feed back a hybrid automatic repeat request-acknowledgement information of a predetermined SPS PDSCH among the SPS PDSCHs;

Case 4: determining to feed back a hybrid automatic repeat request-acknowledgement information of the PDCCH and not to feed back a hybrid automatic repeat request-acknowledgement information of a predetermined SPS PDSCH among the SPS PDSCHs in response to one of following conditions being met:

a hybrid automatic repeat request-acknowledgement information of the PDCCH and a hybrid automatic repeat request-acknowledgement information of at least one SPS PDSCH are to be transmitted in a same slot or sub-slot, wherein the at least one SPS PDSCH is one SPS PDSCH of SPS PDSCHs indicated to be released by the PDCCH;

or, a hybrid automatic repeat request-acknowledgement information of the PDCCH and a hybrid automatic repeat request-acknowledgement information of at least one SPS PDSCH are to be transmitted in a same slot or sub-slot, wherein the at least one SPS PDSCH is transmitted in a slot in which the PDCCH is transmitted and is one SPS PDSCH of SPS PDSCHs indicated to be released by the PDCCH;

or, a hybrid automatic repeat request-acknowledgement information of the PDCCH and a hybrid automatic repeat request-acknowledgement information of the predetermined SPS PDSCH are to be transmitted in a same slot or sub-slot;

Case 5: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs having a same priority;

Case 6: determining to feed back a hybrid automatic repeat request-acknowledgement information of the PDCCH and not to feed back a hybrid automatic repeat request-acknowledgement information of a predetermined SPS PDSCH among the SPS PDSCHs in response to the PDCCH and the SPS PDSCHs being transmitted on a same carrier;

Case 7: determining to feed back a hybrid automatic repeat request-acknowledgement information of the PDCCH and not to feed back a hybrid automatic repeat request-acknowledgement information of a predetermined SPS PDSCH among the SPS PDSCHs in response to the terminal being configured with a semi-static hybrid automatic repeat request-acknowledgement information transmission mode;

Case 8: in response to there are C downlink transmission opportunities in the slot, and a PDCCH indicating SPS resource release is received in a slot in which B SPS PDSCHs need to be received, determining to feed back a hybrid automatic repeat request-acknowledgement information of the PDCCH and not to feed back a hybrid automatic repeat request-acknowledgement information of a predetermined SPS PDSCH among the B SPS PDSCHs, wherein C is greater than or equal to 1, and B is less than or equal to C;

Case 9: in response to SPS PDSCHs indicated to be released by the PDCCH being contained in the slot, or in response to at least one of SPS PDSCHs indicated to be released by the PDCCH being contained in the slot, or in response to an SPS PDSCH with a smallest SPS configuration index or a largest SPS configuration index among SPS PDSCHs indicated to be released by the PDCCH being contained in the slot, determining that the terminal feeds back a hybrid automatic repeat request-acknowledgement information of the PDCCH and not to feed back a hybrid automatic repeat request-acknowledgement information of the predetermined SPS PDSCH among the SPS PDSCHs.

18. The apparatus according to claim 16, wherein the predetermined SPS PDSCH comprises:

an SPS PDSCH with a smallest SPS configuration index or largest SPS configuration index among the SPS PDSCHs;

or, in response to the PDCCH only indicating a release of one SPS PDSCH, the predetermined SPS PDSCH is the one SPS PDSCH indicated to be released by the PDCCH;

or, in response to the PDCCH indicating a joint release of a plurality of SPS PDSCHs, the predetermined SPS PDSCH is an SPS PDSCH transmitted in the slot with a smallest SPS configuration index or largest SPS configuration index among the plurality of SPS PDSCHs indicated to be jointly released by the PDCCH, or an SPS PDSCH with a smallest SPS configuration index or largest SPS configuration index among the plurality of SPS PDSCHs indicated to be jointly released by the PDCCH.

19. The apparatus according to claim 16, wherein the processor is further configured to invoke the program instructions stored in the memory and perform any one of followings:

Case 1: in response to the PDCCH only indicates release of one SPS PDSCH:

the PDCCH is transmitted in a slot in which the one SPS PDSCH indicated to be released is transmitted;

or, the PDCCH is transmitted in a slot in which the one SPS PDSCH indicated to be released is transmitted, and no later than a position of a start or end symbol of the one SPS PDSCH indicated to be released;

Case 2: in response to the PDCCH indicates joint release of a plurality of SPS PDSCHs:

the PDCCH is transmitted in one of slots in which the plurality of SPS PDSCH indicated to be jointly released are transmitted, or in a slot in which an SPS PDSCH with a smallest SPS configuration index or a largest SPS configuration index among the plurality of SPS PDSCHs is transmitted;

or, the PDCCH is transmitted in one of slots in which the plurality of SPS PDSCHs indicated to be jointly released are transmitted, and no later than a position of a start or end symbol of an SPS PDSCH contained in the one slot and indicated by the PDCCH to be released;

or, the PDCCH is transmitted no later than a position of a start or end symbol of an SPS PDSCH with a smallest or largest SPS configuration index among the plurality of SPS PDSCHs indicated to be jointly released in a slot in which the SPS PDSCH with the smallest or largest SPS configuration index is transmitted.

20. The apparatus according to claim 16, wherein the processor is further configured to invoke the program instructions stored in the memory and perform any one of followings:

Case 1: in response to the PDCCH only indicating release of one SPS PDSCH:

the PDCCH is sent in a slot where the SPS PDSCH indicated to be released by the PDCCH is located, or the PDCCH is sent in a slot containing the SPS PDSCH indicated to be released by the PDCCH;

or, the PDCCH is sent earlier than a position of a start or end symbol of the SPS PDSCH in a slot where the SPS PDSCH indicated to be released by the PDCCH is located, or the PDCCH is sent later than a position of a start or end symbol of the SPS PDSCH in a slot where the SPS PDSCH indicated to be released by the PDCCH is located;

Case 2: in response to the PDCCH indicating joint release of a plurality of SPS PDSCHs:

the PDCCH is sent in a slot in which an SPS PDSCH with a smallest or largest SPS configuration index among the SPS PDSCHs indicated to be jointly released by the PDCCH is transmitted, or the PDCCH is sent in a slot containing an SPS PDSCH with a smallest or largest SPS configuration index among the SPS PDSCHs indicated to be jointly released by the PDCCH;

or, the PDCCH is sent earlier than a position of a start or end symbol of an SPS PDSCH with a smallest or largest SPS configuration index among the SPS PDSCHs indicated to be jointly released by the PDCCH in a slot in which the SPS PDSCH with the smallest or largest SPS configuration index is transmitted, or the PDCCH is sent later than a position of a start or end symbol of an SPS PDSCH with a smallest or largest SPS configuration index among the SPS PDSCHs indicated to be jointly released by the PDCCH in a slot in which the SPS PDSCH with the smallest or largest SPS configuration index is transmitted;

Case 3:

the hybrid automatic repeat request-acknowledgement information of the PDCCH is mapped to a hybrid automatic repeat request-acknowledgement information position corresponding to the predetermined SPS PDSCH in a hybrid automatic repeat request-acknowledgement codebook for transmission;

Case 4:

the SPS PDSCHs comprise: an SPS PDSCH that needs feedback of hybrid automatic repeat request-acknowledgment information, and/or an SPS PDSCH determined not to collide with an uplink symbol according to a slot structure configured by high-layer signaling.

* * * * *